(12) United States Patent
Misra et al.

(10) Patent No.: US 12,718,794 B2
(45) Date of Patent: Aug. 25, 2026

(54) METHOD OF SIGNALING AN AUDIO STREAM PROPERTIES DESCRIPTOR, DEVICE FOR SIGNALING AN AUDIO STREAM PROPERTIES DESCRIPTOR, AND DEVICE FOR RECEIVING AN AUDIO STREAM PROPERTIES DESCRIPTOR

(71) Applicant: SHARP KABUSHIKI KAISHA, Osaka (JP)

(72) Inventors: Kiran Mukesh Misra, Camas, WA (US); Sachin G. Deshpande, Camas, WA (US); Sheau Ng, Camas, WA (US); Christopher Andrew Segall, Camas, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 147 days.

(21) Appl. No.: 18/790,603

(22) Filed: Jul. 31, 2024

(65) Prior Publication Data

US 2024/0395241 A1 Nov. 28, 2024

Related U.S. Application Data

(63) Continuation of application No. 18/095,804, filed on Jan. 11, 2023, now Pat. No. 12,106,747, which is a (Continued)

(51) Int. Cl.
*H04H 60/02* (2008.01)
*G06F 40/263* (2020.01)

(Continued)

(52) U.S. Cl.
CPC .......... *G10L 15/005* (2013.01); *G06F 40/263* (2020.01); *H04H 20/59* (2013.01);

(Continued)

(58) Field of Classification Search
CPC .... H04H 60/02; H04N 21/236; G06F 40/263; G06F 40/274
See application file for complete search history.

(56) References Cited

U.S. PATENT DOCUMENTS 6,415,250 B1 7/2002 van den Akker
7,757,249 B2 7/2010 Kim et al.

(Continued)

FOREIGN PATENT DOCUMENTS

EP 2051532 A1 4/2009
JP 2003-018673 A 1/2003
JP 2010-141624 A 6/2010

OTHER PUBLICATIONS

Kyungmo Park, "Draft text of ISO/IEC 23008-1 2nd edition", International Organisation for Standardisation Organisation Internationale De Normalisation ISO/IEC JTC1/SC29/WG11 Coding of Moving Pictures and Audio, MPEG2014/w15229, Feb. 2015, Geneva, Switzerland.

(Continued)

*Primary Examiner* — Daniel Abebe
(74) *Attorney, Agent, or Firm* — ScienBiziP, P.C.

(57) ABSTRACT

A device may be configured to parse a syntax element specifying the number of available languages within a presentation associated with an audio stream. A device may be configured to parse one or more syntax elements identifying each of the available languages and parse an accessibility syntax element for each language within the presentation.

3 Claims, 8 Drawing Sheets

Related U.S. Application Data continuation of application No. 17/037,474, filed on Sep. 29, 2020, now Pat. No. 11,615,778, which is a continuation of application No. 16/087,601, filed as application No. PCT/JP2017/011592 on Mar. 23, 2017, now Pat. No. 10,861,435.

(60) Provisional application No. 62/325,406, filed on Apr. 20, 2016, provisional application No. 62/319,209, filed on Apr. 6, 2016, provisional application No. 62/315,611, filed on Mar. 30, 2016, provisional application No. 62/313,635, filed on Mar. 25, 2016.

(51) Int. Cl.

| | |
|---|---|
| ***G10L 15/00*** | (2013.01) |
| ***H04H 20/59*** | (2008.01) |
| ***H04H 20/86*** | (2008.01) |
| ***H04H 60/58*** | (2008.01) |
| ***H04N 21/233*** | (2011.01) |
| ***H04N 21/2362*** | (2011.01) |

(52) U.S. Cl.

CPC ............ *H04H 20/86* (2013.01); *H04H 60/58* (2013.01); *H04N 21/233* (2013.01); *H04N 21/2362* (2013.01)

(56) References Cited

U.S. PATENT DOCUMENTS 8,600,733 B1 * 12/2013 Buryak ................... G06F 40/58 704/8
8,948,241 B2 * 2/2015 Chen .................. H04N 21/6336 375/240
10,674,229 B2 * 6/2020 Krauss .................. G06F 16/635
2005/0285980 A1 12/2005 Katayama
2007/0118801 A1 * 5/2007 Harshbarger ...... H04N 21/8543 715/204
2009/0199232 A1 8/2009 Takeyama et al.
2012/0177342 A1 7/2012 Hashimoto et al.
2012/0316860 A1 12/2012 Reitan
2016/0094895 A1 3/2016 Stadelmeier et al.
2017/0013093 A1 1/2017 Kwon et al.
2019/0253739 A1 8/2019 Deshpande
2020/0228848 A1 * 7/2020 Brondijk ............. H04N 21/235

OTHER PUBLICATIONS

"Information technology—Dynamic adaptive streaming over HTTP (DASH)—Part 1: Media presentation description and segment formats", International Standard, ISO/IEC 23009-1, Draft third edition, Dec. 7, 2015.

"ATSC Candidate Standard: Signaling, Delivery, Synchronization, and Error Protection (A/331)", Advanced Television Systems Committee, Doc. S33-174r1, Jan. 5, 2016.

"ATSC Candidate Standard: Physical Layer Protocol", Advanced Television Systems Committee, Doc. S32-230r21, Sep. 28, 2015.

Non-Final Office Action issued on Mar. 20, 2020 for U.S. Appl. No. 16/087,601, which is the family application of the instant application.

Notice of Allowance and Fee(s) Due issued on Aug. 17, 2020 for U.S. Appl. No. 16/087,601, which is the family application of the instant application.

Non-Final Office Action issued on Aug. 15, 2022 for U.S. Appl. No. 17/037,474, which is the family application of the instant application.

Notice of Allowance and Fee(s) Due issued on Dec. 13, 2022 for U.S. Appl. No. 17/037,474, which is the family application of the instant application.

Non-Final Office Action issued on Jan. 9, 2024 for U.S. Appl. No. 18/095,804, which is the parent application of the instant application.

Notice of Allowance and Fee(s) Due issued on May 28, 2024 for U.S. Appl. No. 18/095,804, which is the parent application of the instant application.

* cited by examiner

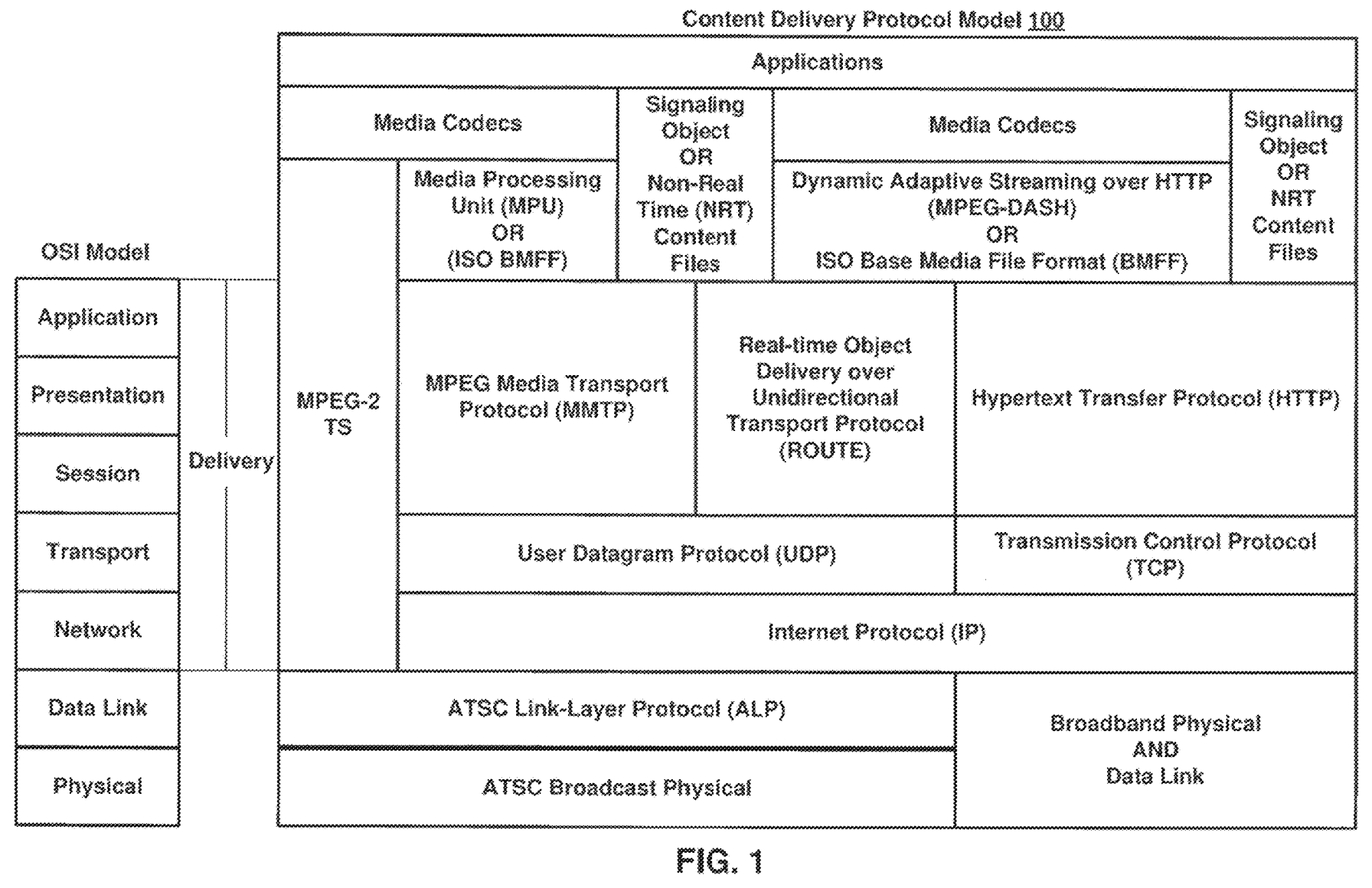

Content Delivery Protocol Model 100

Applications

Media Codecs

Media Processing Unit (MPU) OR (ISO BMFF)

MPEG-2 TS

MPEG Media Transport Protocol (MMTP)

Signaling Object OR Non-Real Time (NRT) Content Files

Real-time Object Delivery over Unidirectional Transport Protocol (ROUTE)

Media Codecs

Dynamic Adaptive Streaming over HTTP (MPEG-DASH) OR ISO Base Media File Format (BMFF)

Signaling Object OR NRT Content Files

Hypertext Transfer Protocol (HTTP)

User Datagram Protocol (UDP)

Transmission Control Protocol (TCP)

Internet Protocol (IP)

ATSC Link-Layer Protocol (ALP)

ATSC Broadcast Physical

Broadband Physical AND Data Link

Delivery

OSI Model

Application

Presentation

Session

Transport

Network

Data Link

Physical

FIG. 1

METHOD OF SIGNALING AN AUDIO STREAM PROPERTIES DESCRIPTOR, DEVICE FOR SIGNALING AN AUDIO STREAM PROPERTIES DESCRIPTOR, AND DEVICE FOR RECEIVING AN AUDIO STREAM PROPERTIES DESCRIPTOR

TECHNICAL FIELD

The present disclosure relates to the field of interactive television.

BACKGROUND ART

Digital media playback capabilities may be incorporated into a wide range of devices, including digital televisions, including so-called "smart" televisions, set-top boxes, laptop or desktop computers, tablet computers, digital recording devices, digital media players, video gaming devices, cellular phones, including so-called "smart" phones, dedicated video streaming devices, and the like. Digital media content (e.g., video and audio programming) may originate from a plurality of sources including, for example, over-the-air television providers, satellite television providers, cable television providers, online media service providers, including, so-called streaming service providers, and the like. Digital media content may be delivered over packet-switched networks, including bidirectional networks, such as Internet Protocol (IP) networks and unidirectional networks, such as digital broadcast networks.

Digital media content may be transmitted from a source to a receiver device (e.g., a digital television or a smart phone) according to a transmission standard. Examples of transmission standards include Digital Video Broadcasting (DVB) standards, Integrated Services Digital Broadcasting Standards (ISDB) standards, and standards developed by the Advanced Television Systems Committee (ATSC), including, for example, the ATSC 2.0 standard. The ATSC is currently developing the so-called ATSC 3.0 suite of standards. The ATSC 3.0 suite of standards seek to support a wide range of diverse services through diverse delivery mechanisms. For example, the ATSC 3.0 suite of standards seeks to support broadcast multimedia delivery, so-called broadcast streaming/file download multimedia delivery, so-called broadband streaming/file download multimedia delivery, and combinations thereof (i.e., "hybrid services"). An example of a hybrid service contemplated for the ATSC 3.0 suite of standards includes a receiver device receiving an over-the-air video broadcast (e.g., through a unidirectional transport) and receiving a synchronized secondary audio presentation (e.g., a secondary language) from an online media service provider through a packet network (i.e., through a bidirectional transport). Currently proposed techniques for supporting audio content may be less than ideal.

SUMMARY OF INVENTION

In general, this disclosure describes techniques for signaling (or signalling) information associated with audio content associated with a service. It should be noted that audio content may be included as part of an audio-visual service (e.g., television programming) or in some examples may be included as a dedicated audio service (e.g., radio programming). It should be noted that although in some examples the techniques of this disclosure are described with respect to ATSC standards and particular audio standards and formats, the techniques described herein may be generally applicable to any transmission standard and audio standard or format. For example, the techniques described herein may be generally applicable to any of DVB standards, ISDB standards, ATSC Standards, Digital Terrestrial Multimedia Broadcast (DTMB) standards, Digital Multimedia Broadcast (DMB) standards, Hybrid Broadcast and Broadband Television (HbbTV) standards, World Wide Web Consortium (W3C) standards, Universal Plug and Play (UPnP) standards, and other video encoding standards. Further, it should be noted that incorporation by reference of documents herein is for descriptive purposes and should not be constructed to limit and/or create ambiguity with respect to terms used herein. For example, in the case where one incorporated reference provides a different definition of a term than another incorporated reference and/or as the term is used herein, the term should be interpreted in a manner that broadly includes each respective definition and/or in a manner that includes each of the particular definitions in the alternative.

According to one example of the disclosure, a method for signaling information associated with an audio stream comprises signaling a syntax element specifying the number of available languages within a presentation associated with an audio stream and signaling one or more syntax elements identifying each of the available languages.

According to another example of the disclosure, a device for signaling information associated with an audio stream comprises one or more processors configured to signal a syntax element specifying the number of available languages within a presentation associated with an audio stream and signal one or more syntax elements identifying each of the available languages.

According to one example of the disclosure, a method for parsing information associated with an audio stream, comprises parsing a syntax element specifying the number of available languages within a presentation associated with an audio stream and parsing one or more syntax elements identifying each of the available languages.

According to one example of the disclosure, a method for signaling information associated with an audio stream associated with emergency information, the method comprising signaling a syntax element indicating the audio stream is associated with emergency information; and signaling one or more syntax elements identifying timing information of the emergency information.

According to one example of the disclosure, a method for parsing information associated with an audio stream, the method comprising parsing a syntax element indicating the audio stream is associated with emergency information; and parsing one or more syntax elements identifying timing information of the emergency information, upon determining the audio stream is associated with emergency information.

The details of one or more examples are set forth in the accompanying drawings and the description below. Other features, objects, and advantages will be apparent from the description and drawings, and from the claims.

BRIEF DESCRIPTION OF DRAWINGS

FIG. 1 is a conceptual diagram illustrating an example of content delivery protocol model according to one or more techniques of this disclosure.

DESCRIPTION OF EMBODIMENTS

Figure 2A:
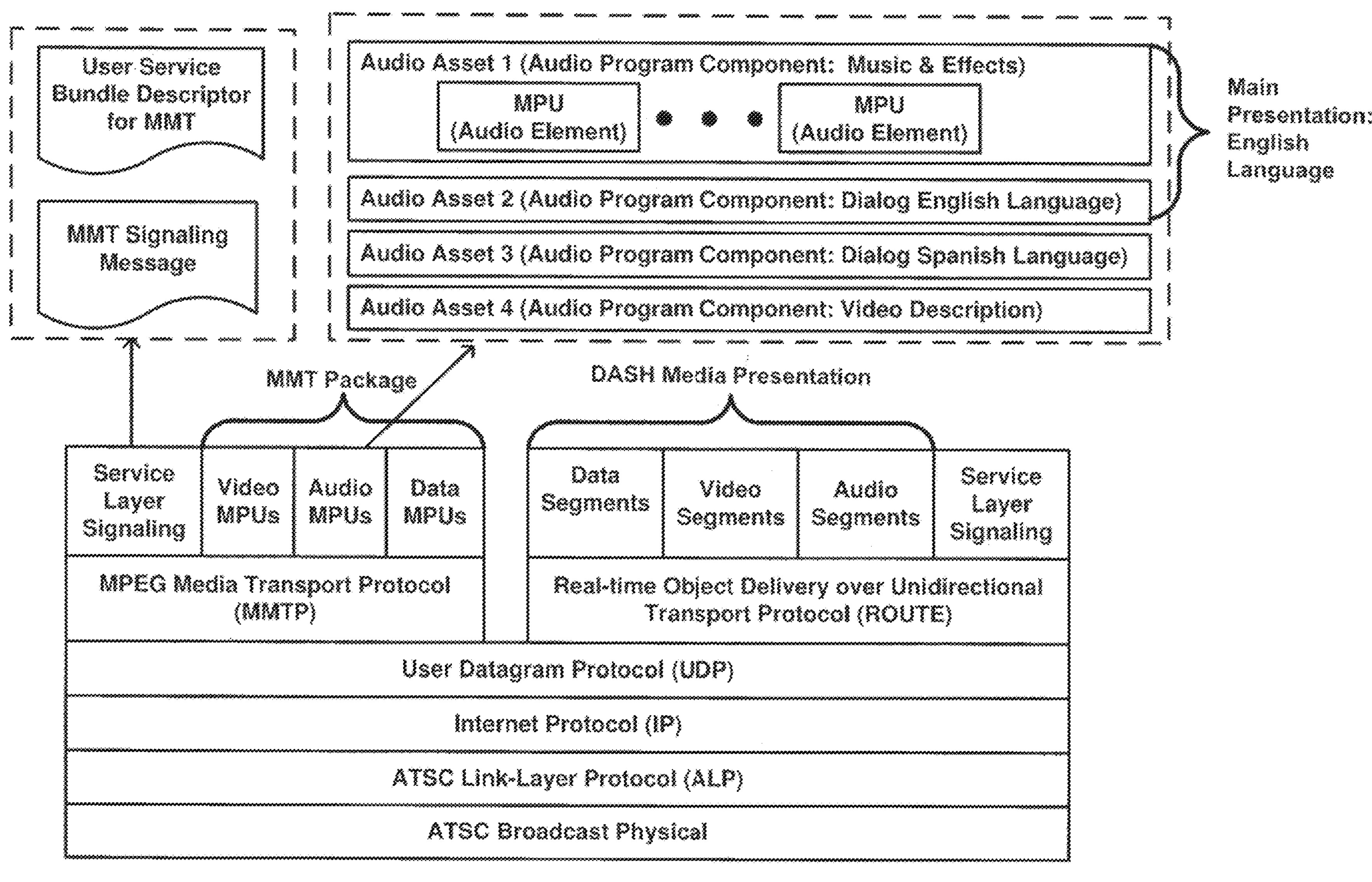
FIG. 2A is a conceptual diagram illustrating an example of respective delivery mechanisms of a media service according to one or more techniques of this disclosure.

Computing devices and/or transmission systems may be based on models including one or more abstraction layers, where data at each abstraction layer is represented according to particular structures, e.g., packet structures, modulation schemes, etc. An example of a model including defined abstraction layers is the so-called Open Systems Interconnection (OSI) model illustrated in FIG. 1. The OSI model defines a 7-layer stack model, including an application layer, a presentation layer, a session layer, a transport layer, a network layer, a data link layer, and a physical layer. It should be noted that the use of the terms upper and lower with respect to describing the layers in a stack model may be based on the application layer being the uppermost layer and the physical layer being the lowermost layer. Further, in some cases, the term "Layer 1" or "L1" may be used to refer to a physical layer, the term "Layer 2" or "L2" may be used to refer to a link layer, and the term "Layer 3" or "L3" or "IP layer" may be used to refer to the network layer.

A physical layer may generally refer to a layer at which electrical signals form digital data. For example, a physical layer may refer to a layer that defines how modulated radio frequency (RF) symbols form a frame of digital data. A data link layer, which may also be referred to as link layer, may refer to an abstraction used prior to physical layer processing at a sending side and after physical layer reception at a receiving side. As used herein, a link layer may refer to an abstraction used to transport data from a network layer to a physical layer at a sending side and used to transport data from a physical layer to a network layer at a receiving side. It should be noted that a sending side and a receiving side are logical roles and a single device may operate as both a sending side in one instance and as a receiving side in another instance. A link layer may abstract various types of data (e.g., video, audio, or application files) encapsulated in particular packet types (e.g., Motion Picture Expert Group-Transport Stream (MPEG-TS) packets, Internet Protocol Version 4 (IPv4) packets, etc.) into a single generic format for processing by a physical layer. A network layer may generally refer to a layer at which logical addressing occurs. That is, a network layer may generally provide addressing information (e.g., Internet Protocol (IP) addresses) such that data packets can be delivered to a particular node (e.g., a computing device) within a network. As used herein, the term network layer may refer to a layer above a link layer and/or a layer having data in a structure such that it may be received for link layer processing. Each of a transport layer, a session layer, a presentation layer, and an application layer may define how data is delivered for use by a user application.

Transmission standards, including transmission standards currently under development, may include a content delivery protocol model specifying supported protocols for each layer and may further define one or more specific layer implementations. Referring again to FIG. 1, an example content delivery protocol model is illustrated. In the example illustrated in FIG. 1, content delivery protocol model 100 is "aligned" with the 7-layer OSI model for illustration purposes. It should be noted that such an illustration should not be construed to limit implementations of the content delivery protocol model 100 or the techniques described herein. Content delivery protocol model 100 may generally correspond to the currently proposed content delivery protocol model for the ATSC 3.0 suite of standards. Further, the techniques described herein may be implemented in a system configured to operate based on content delivery protocol model 100.

Aspects of the ATSC 3.0 suite of standards currently under development are described in Candidate Standards and Working Drafts, which may include proposed aspects for inclusion in a published (i.e., "final" or "adopted") version of an ATSC 3.0 standard. For example, ATSC Candidate Standard: Physical Layer Protocol, Doc. S32-230r21, 28 Sep. 2015, which is incorporated by reference in its entirety, describes specific proposed aspects of an ATSC 3.0 unidirectional physical layer implementation. The proposed ATSC 3.0 unidirectional physical layer includes a physical layer frame structure including a defined bootstrap, preamble, and data payload structure including one or more physical layer pipes (PLPs). A PLP may generally refer to a logical structure within an RF channel or a portion of an RF channel. That is, a PLP may include a portion of an RF channel having particular modulation and coding parameters. The proposed ATSC 3.0 unidirectional physical layer provides that a single RF channel can contain one or more PLPs and each PLP may carry one or more services. In one example, multiple PLPs may carry a single service. In the proposed ATSC 3.0 suite of standards, the term service may be used to refer to a collection of media components presented to the user in aggregate (e.g., a video component, an audio component, and a sub-title component), where components may be of multiple media types, where a service can be either continuous or intermittent, where a service can be a real time service (e.g., multimedia presentation corresponding to a live event) or a non-real time service (e.g., a video on demand service, an electronic service guide service), and where a real time service may include a sequence of television programs. Further, the proposed ATSC 3.0 suite of standards defines five service categories as follows: (1) A "linear audio/video service" is a service consisting of one or more continuous video components, one or more continuous audio components, each associated with one or more of the video components, and one or more closed caption components, each associated with one or more of the audio components, all streamed in real time. May also contain app-based features; (2) A "linear audio-only service" is a service consisting of one or more continuous audio components and one or more closed caption components, each associated with one or more of the audio components, all streamed in real time. May also contain app-based features; (3) An "app-based service" is a service consisting entirely of app-based features, which provide the user interface for the service; An App-Based Feature is a service component consisting of an application, optional files to be used by the application, and optional notifications directing the application to take particular actions at particular times; (4) An "ESG (ESG) service (program guide) service" is a service that delivers Electronic Service Guide information; and (5) An "Emergency Alert (EA) service" provides emergency alerting information (text and, if available, associated video and/or audio content) and rich media resources that are referenced in emergency information messages. In one example, an application may be a collection of documents constituting an enhanced or interactive service. The documents of an application may include HTML, JavaScript, CSS, XML and multimedia files. It should be noted that the proposed ATSC 3.0 suite of standards specifies that new types of services may be defined in future versions. Thus, as used herein the term service may refer to a service described with respect to the proposed ATSC 3.0 suite of standards and/or other types of digital media services.

A service (e.g., a linear audio/video service) may include emergency information. In one example, emergency information may be defined as information, about a current emergency, that is intended to further the protection of life, health, safety, and property, including critical details regarding the emergency and how to respond to the emergency. Examples of the types of emergencies covered include tornadoes, hurricanes, floods, tidal waves, earthquakes, icing conditions, heavy snows, widespread fires, discharge of toxic gases, widespread power failures, industrial explosions, civil disorders, and warnings and watches of impending changes in weather. Emergency information may be displayed in video as text (which may be referred to as emergency on-screen text information), and may include, for example, a scrolling banner (which may be referred to as a crawl). Signaling may be needed for emergency information to support a separate audio component provided by the broadcaster during the display of the scrolling banner. Signaling may need to occur at the start of message and also signal the end of message. This signaling could enable the capabilities in a receiver to allow a visually impaired viewer to manually select the emergency information audio component into the decoded output and/or allow a user preference setting so that a receiver could retain and act on the user preference. In the latter case, the signaling of the presence of an active audio component may be essential. In one example, an emergency information audio component may be different from a non-real-time audio file, which may be part of the enhanced alert information, or a separate main audio. In some examples, emergency information may include information that is distinct from information provided through an emergency alert service. In one example, audio for an emergency alert may be included in main audio. In one example, the start/end time of audio/aural representation of the emergency information and the corresponding video crawl may not be aligned. In one example, the start/end time of audio/aural representation of the emergency information and the corresponding video crawl may be partially aligned. In one example, the start/end time of audio/aural representation of the emergency information and the corresponding video crawl may be aligned.

Referring to FIG. 1, content delivery protocol model 100 supports streaming and/or file download through the ATSC Broadcast Physical layer using MPEG Media Transport Protocol (MMTP) over User Datagram Protocol (UDP) and Internet Protocol (IP) and Real-time Object delivery over Unidirectional Transport (ROUTE) over UDP and IP. MMTP is described in ISO/IEC: ISO/IEC 23008-1, "Information technology-High efficiency coding and media delivery in heterogeneous environments-Part 1: MPEG media transport (MMT)," which is incorporated by reference herein in its entirety. An overview of ROUTE is provided in ATSC Candidate Standard: Signaling, Delivery, Synchronization, and Error Protection (A/331) Doc. S32-174r1, 5 Jan. 2016 (hereinafter "A/331"), which is incorporated by reference in its entirety. It should be noted that although ATSC 3.0 uses the term broadcast to refer to a unidirectional over-the-air transmission physical layer, the so-called ATSC 3.0 broadcast physical layer supports video delivery through streaming or file download. As such, the term broadcast as used herein should not be used to limit the manner in which video and associated data may be transported according to one or more techniques of this disclosure.

In the case where MMTP is used for streaming and/or file download through the ATSC Broadcast Physical layer, service component data (e.g., video data, audio data, closed caption data, etc.) may be encapsulated in a Media Processing Unit (MPU). MMTP defines a MPU as "a media data item that may be processed by an MMT entity and consumed by the presentation engine independently from other MPUs." A logical grouping of MPUs may form an MMT asset, where MMTP defines an asset as "any multimedia data to be used for building a multimedia presentation. An asset is a logical grouping of MPUs that share the same asset identifier for carrying encoded media data." For example, for a video component, MPUs may include groups of pictures (GOPs) that are independently decodable and an asset may include several MPUs forming a video sequence. One or more assets may form a MMT package, where a MMT package is a logical collection of media content. For example, an MMT package may include an asset corresponding to a video component and an asset corresponding to an audio component. It should be noted that A/331 provides the following definitions for Asset, Media Processing Unit and MMT Package:

'Asset'—Any multimedia data entity that is associated with a unique identifier and that is used for building a multimedia presentation.

'Media Processing Unit'—Generic container for independently decodable timed or non-timed data that is media codec agnostic 'MMT Package'—Logical collection of media data, delivered using MMT.

As used herein the terms asset, media processing unit, and MMT Package may be inclusion of definitions provided in A/331 and MMTP in a general manner and/or may include respective definitions in the alternative. A/331 provides that a single MMT package can be delivered over one or more MMTP sessions, where each MMTP session can be identified by a destination IP address and a destination UDP port number. Further, A/331 provides that multiple MMT packages can be delivered by a single MMTP session. A/331 provides that each PLP can carry one or more MMTP sessions. In addition, A/331 provides that one MMTP session can be carried by more than one PLP. Further, it should be noted that packets including MPUs and/or MPU fragment may form a stream.

In the case where ROUTE is used for streaming and/or file download through the ATSC Broadcast Physical layer, service component data (e.g., video data, audio data, closed caption data, etc.) may be encapsulated in a Dynamic Adaptive Streaming over Hypertext Transport Protocol (HTTP) (DASH) Media Presentation (i.e., ROUTE/DASH). Further, service component data may be associated with one or more segments carried over Layer Coding Transport (LCT) channels. In some cases, an LCT channel may be conceptually similar to an MMT asset and/or segments may be conceptually similar to MPUs. That is, for media delivery, an LCT channel may carry as a whole, or in part, a media component and a ROUTE session may be considered as the multiplex of LCT channels that carry constituent media components of one or more media presentations. That is, each ROUTE session may include one or more LCT channels, where LCT channels are subsets of a ROUTE session. Further, A/331 provides that one or more LCT channels may be included in a PLP and as such, a ROUTE session may be carried by one or more PLPs. Further, similar to a MMTP session, A/331 provides that a ROUTE session may be identified by a destination IP address and a destination UDP port number. It should be noted that a ROUTE session may further be identified by a source IP address.

As described above, aspects of the ATSC 3.0 suite of standards currently under development are described Working Drafts. ATSC Working Draft: Audio, Part 1: Common Elements Doc. 34-2-235r9 (herein after "ATSC Audio WD"), which is incorporated by reference herein, describes an Audio Program as the complete collection of all Audio Program Components and a set of accompanying Audio Presentations that are available for one Audio Program, where an Audio Presentation is a set of Audio Program Components representing a version of the Audio Program that may be selected by a user for simultaneous decoding and an Audio Program Component is a logical group of one or more Audio Elements that is used to define an Audio Presentation. In the ATSC Audio WD, Audio elements are defined as the smallest addressable unit of an Audio Program and may consist of one or more Audio Signals, where an Audio Signal is a mono signal. In the ATSC Audio WD, Audio element format corresponds to the description of the configuration and type of an Audio Element. There are three different types of Audio Element Formats. Depending on the type, different kinds of properties are used to describe the configuration: Channel-based audio: e.g., the number of channels and the channel layout; Object-based audio: e.g., dynamic positional information; Scene-based audio: e.g., Higher Order Ambisonics (HOA) order, number of transport channels. In one example, an Audio Program may include an English language dialogue Audio Program Component, a Spanish language dialogue Audio Program Component, and a music and effects Audio Program Component. Each program component may include one or more audio channels. For example, Audio Program Components may be in stereo (i.e., a so-called "2.0" presentation including left and right audio channels) or may be in a surround sound format (e.g., 5.1 audio), or the like. In one example, with respect to the audio program components above, English language dialogue Audio Program Component and music and effects Audio Program Component may form an English language presentation and Spanish language dialogue Audio Program Component and music and effects Audio Program Component may form a Spanish language presentation. Thus, an audio presentation may be described as a logical grouping of Audio Elements, where Audio Elements form Audio Program Components. It should be noted that ATSC Audio WD contemplates that different terminology may be used with respect to describing audio data and includes Table 1 in order to relate terms to one another.

TABLE 1

| Common Term | DASH Term | Dolby AC-4 Term | MPEG-H (ISO IEC 23008-3) Audio Term |
|---|---|---|---|
| Audio Presentation | Preselection | Presentation | Preset |
| Audio Program | Bundle | Audio Program | Audio Scene |
| Audio Program Component | Referred to as Audio Element | Audio Program Component | Group |

Figure 2B:
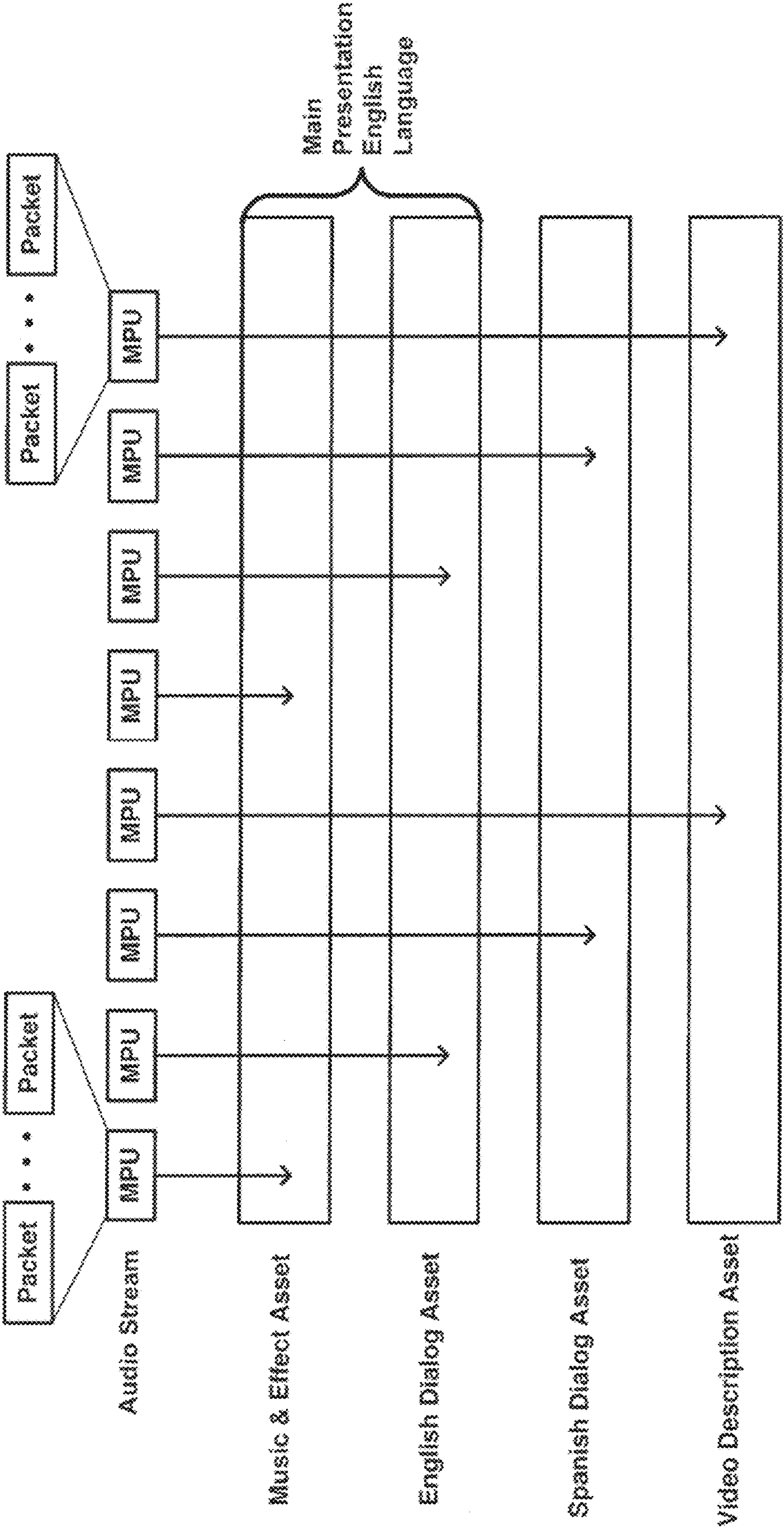
FIG. 2B is a conceptual diagram illustrating an example of a stream delivery mechanism of a media service according to one or more techniques of this disclosure.

As used herein the terms audio presentation, audio program, and audio program component may, in some examples, be inclusive of corresponding terms used to describe similar structures in other audio systems. As described above, one or more assets including MPUs may form a MMT package packets that include MPUs and/or fragments thereof may form a stream. In one example, an audio stream may be formed as a group of packets including MPUs encapsulating audio data. FIG. 2A is a conceptual diagram illustrating respective delivery mechanisms of a service as an MMT package and a service as DASH media presentation. FIG. 2A illustrates additional detail of audio assets that may be included as part of an MMT package. In the example, illustrated in FIG. 2A, each audio asset may correspond to the example Audio Program Components described above. FIG. 2B further illustrates the grouping of the MPUs (or fragments thereof) included in the assets illustrated in FIG. 2A, included in an audio stream. That is, a receiver receiving packets included in an audio stream may parse the packets into assets. It should be noted that the example illustrated in FIGS. 2A-2B is for descriptive purposes and should not be constructed to limit the scope of the techniques described herein. Referring again to FIG. 2A, for each respective delivery mechanism corresponding service layer signaling occurs. In general, service layer (or level) signaling (SLS) may include information that enables a receiver to discover and/or access user services and their content components. A/331 provides specific data structures that may be included as part of a service layer signaling. That is, A/331 defines a set of message formats to be used to communicate signaling information necessary for the delivery and consumption of services by a receiver device. Referring to FIG. 2A, for service layer signaling with respect to a MMTP delivery mechanism, A/331 service layer signaling includes a User Service Bundle Descriptor (USBD) and MMT specific signaling messages. For the sake of brevity, the format of the USBD for MMT is not described herein, however, reference is made to A/331. It should be noted that in one example, receiver devices may be expected to disregard reserved values, and unrecognized or unsupported descriptors, XML attributes and elements. In one example, reserved fields are reserved for future use and receiving devices conforming to the defined specification are expected to disregard reserved fields.

In addition to including one or more assets, a MMT package includes presentation information (PI) and asset delivery characteristics (ADC). Presentation information includes documents (PI documents). A PI document may be delivered as one or more signalling messages. Asset delivery characteristics describe the quality of service (QoS) requirements and statistics of assets for delivery. PIs and ADCs may be associated with one or more assets and MPUs encapsulated therein. MMT specifies a signaling function that defines a set of message formats for signaling messages. MMT specifies message formats for carrying signaling tables, descriptors or delivery related information. Table 2 provides the syntax of the general format of MMT signaling messages. It should be noted that in Table 2, and other tables included in this description, uimsbf refers to an unsigned integer most significant bit first data type. Further, bslbf refers to a bit string, left bit first data type.

TABLE 2

| Syntax | Value | No. of bits | Mnemonic |
|---|---|---|---|
| signalling_message ( ) { | | | |
| message_id | | 16 | uimsbf |
| version | | 8 | uimsbf |
| if(message_id != PA_message && message_id != MPI_message) { | | | |
| length | | 16 | uimsbf |
| } else { | | | |
| length | | 32 | uimsbf |
| } | | | |
| extension | | | |
| message_payload { | | | |
| } | | | |
| } | | | |

'message_payload'—the payload of the signalling message. The format of this field can be identified by the value of the message_id field.

As illustrated in Table 2, a message may be identified using a message identifier value. In MMT, message identifier values of 0x8000 to 0xFFFF may be reserved for private use. A/331 defines a MMT signaling message (e.g., mmt_atsc3_message( )), where a MMT signaling message is defined to deliver information specific to ATSC 3.0 services. A MMT signaling message may be identified using a MMT message identifier value reserved for private use (e.g., a value of 0x8000 to 0xFFFF). Table 3 provides example syntax for a MMT signaling message mmt_atsc3_message( ).

TABLE 3

| Syntax | No. of Bits | Format |
|---|---|---|
| mmt_atsc3_message( ) { | | |
| message_id | 16 | uimsbf |
| version | 8 | uimsbf |
| length | 32 | uimsbf |
| message payload { | | |
| service_id | 16 | uimsbf |
| atsc3_message_content_type | 8 | uimbsf |
| atsc3_message_content_version | 8 | uimbsf |
| atsc3_message_content_compression | 8 | uimbsf |
| URI_length | 8 | uimbsf |
| for (i=0;i< URI_length;i++) { | | |
| URI_byte | 8 | uimsbf |
| } | | |
| atsc3_message_content_length | 32 | uimsbf |
| for (i=0;i<atsc3_message_content_length;i++) { | | |
| atsc3_message_content_byte | 8 | uimsbf |
| } | | |
| for (i=0;i<length-10-URI_length-atsc3_message_content_length) { | | |
| reserved | 8 | uimsbf |
| } | | |
| } | | |
| } | | |

MMT provides the following definitions for syntax elements 'message_id', 'version', 'length', 'extension', 'message_payload':

'message_id'—this field indicates the identifier of the signalling message. [In one example] Valid message identifier values are listed in Table 34 [of MMT].

'version'—this field indicates the version of the signalling message. Both MMT sending entity and MMT receiving entity can verify whether a received message has a new version of not.

'length'—this field indicates the length of the signalling message. This field for all signalling message except Package Access (PA) messages and Media Presentation Information (MPI) message is 2 bytes long. The length of PA messages and MPI messages is 4 bytes long because it is expected that occasionally an MPI table whose length cannot be expressed by a 2 bytes length fields. Also note that a PA message includes at least one MPI table.

'extension'—this field provides extension information for signalling messages that require extension. The content and length of this field are specified for these signalling messages.

A/331 provides the following definitions for syntax elements 'message_id', 'version', 'length', 'service_id', 'atsc3_message_content_type', 'atsc3_message_content_version', 'atsc3_message_content_compression', 'URI_length', 'URI_byte', 'atsc3_message_content_length', 'atsc3_message_content_byte', 'and reserved':

'message_id'—A 16-bit unsigned integer field that shall uniquely identify the mmt_atsc3_message( ). The value of this field shall be 0x8000.

'version'—An 8-bit unsigned integer field that shall be incremented by 1 any time there is a change in the information carried in this message. When the version field reaches its maximum value of 255, its value shall wraparound to 0.

'length'—A 32-bit unsigned integer field that shall provide the length of mmt_atsc3_message( ) in bytes, counting from the beginning of the next field to the last byte of the mmt_atsc3_message( ).

'service_id'—A 16-bit unsigned integer field that shall associate the message payload with the service identified in the serviceId attribute given in the Service Labeling Table (SLT).

'atsc3_message_content_type'—A 16-bit unsigned integer field that shall uniquely identify the type of message content in the mmt_atsc3_message( ) payload, coded per Table [4] below.

TABLE 4

| atsc3_message_content_type | Meaning |
|---|---|
| 0x0000 | Reserved |
| 0x0001 | A User Service Bundle Description Fragment for MMT |
| 0x0002 | An Media Presentation Descriptor (MPD) |
| 0x0003 | An Application Information Table |
| 0x0004 | Application Event Information |
| 0x0005 | Video Stream Properties Descriptor |
| 0x0006 | An ATSC Staggercast Descriptor |
| 0x0007 | An Inband Event Descriptor |
| 0x0008 | Caption Asset Descriptor |
| 0x0009~0xFFFF | Reserved for future use |

'atsc3_message_content_version'—An 8-bit unsigned integer field that shall be incremented by 1 any time there is a change in the atsc3_message content identified by a service_id and atsc_message_content_type pair. When the atsc3_message_content_version field reaches its maximum value, its value shall wraparound to 0.

'atsc3_message_content_compression'—An 8-bit unsigned integer field that shall identify the type of compression applied to the data in atsc3_message_content_byte.

'URI_length'—An 8-bit unsigned integer field that shall provide the length of the Universal Resource Identifier (URI) uniquely identifying the message payload across services. If the URI is not present, the value of this field shall be set to 0.

'URI_byte'—An 8-bit unsigned integer field that shall contain a UTF-8 [where UTF is an acronym of unicode transformation format] character of the URI associated with the content carried by this message excluding the terminating null character, as per Internet Engineering Task Force (IETF) Request for Comments (RFC) 3986. This field when present shall be used to identify delivered message payloads. The URI can be used by system tables to reference tables made available by delivered message payloads.

'atsc3_message_content_length'—A 32-bit unsigned integer field that shall provide the length of the content carried by this message.

'atsc3_message_content_byte'—An 8-bit unsigned integer field that shall contain a byte of the content carried by this message.

It should be noted that with respect to Table 3 and Table 4 that A/331 defines a video stream properties descriptor, but does not currently define an audio stream properties descriptor. Audio stream properties descriptors are currently being proposed. For example, it has been proposed to expand atsc3_message_content_type as follows:

'atsc3_message_content_type'—A 16-bit unsigned integer field that shall uniquely identify the type of message content in the mmt_atsc3_message( ) payload, coded per Table [5] below.

TABLE 5

| atsc3_message_content_type | Meaning |
|---|---|
| 0x0000 | Reserved |
| 0x0001 | A User Service Bundle Description Fragment for MMT |
| 0x0002 | An Media Presentation Descriptor (MPD) |
| 0x0003 | An Application Information Table |
| 0x0004 | Application Event Information |
| 0x0005 | Video Stream Properties Descriptor |
| 0x0006 | An ATSC Staggercast Descriptor |
| 0x0007 | An Inband Event Descriptor |
| 0x0008 | Caption Asset Descriptor |
| 0x0009 | Audio Stream Properties Descriptor |
| 0x0010~0xFFFF | Reserved for future use |

With respect to Table 5, it should be noted that other values 'atsc3_message_content_type' may correspond to Audio Stream Properties Descriptor (e.g., any of 0x0010~0xFFFF).

Referring again to FIG. 2, for service layer signaling with respect to a ROUTE/DASH delivery mechanism, A/331 service layer signaling includes a Service-based Transport Session Instance Description (S-TSID), a User Service Bundle Descriptor (USBD), and a Media Presentation Document (MPD). Each of a S-TSID, a USBD, and a MPD may include fragments that describe service layer properties. A fragment may include a set of XML-encoded metadata fragments. In one example, the metadata fragments may be carried over a dedicated LCT channel. In A/331, the USBD fragment includes service identification, device capabilities information, references to other SLS fragments required to access the service and constituent media components, and metadata to enable the receiver to determine the transport mode (e.g., broadcast and/or broadband) of service components. In A/331, the USBD also includes a reference to an MPD fragment that contains descriptions for content components of the ATSC 3.0 Service delivered over broadcast and/or broadband. In A/331, the USBD also includes a reference to the S-TSID fragment which provides access related parameters to the transport sessions carrying contents of this ATSC 3.0 Service. In A/331, the S-TSID fragment, referenced by the USBD, provides transport session descriptions for the one or more ROUTE sessions in which the media content components of a service are delivered, and descriptions of the delivery objects carried in those LCT channels. For the sake of brevity, details of the format of the S-TSID and the USBD fragments are not described herein, however, reference is made to A/331.

In A/331, the MPD is a SLS metadata fragment that includes a formalized description of a DASH-IF (DASH Interoperability Forum) profile of a DASH Media Presentation. A DASH Media Presentation may correspond to a linear service or part of a linear service of a given duration defined by a service provider (e.g., a single TV program, or the set of contiguous linear TV programs over a period of time). The contents of the MPD provide the resource identifiers for segments and the context for the identified resources within the Media Presentation. In A/331, the data structure and semantics of the MPD fragment are described with respect to the Media Presentation Description as defined by the DASH-IF profile of MPEG DASH ISO/IEC: ISO/IEC 23009-1:2014, "Information technology—Dynamic adaptive streaming over HTTP (DASH)—Part 1: Media presentation description and segment formats," International Organization for Standardization, 2nd Edition, May 15, 2014 (hereinafter, "ISO/IEC 23009-1:2014"), which is incorporated by reference herein. It should be noted that draft third editions of ISO/IEC 23009-1 are currently being proposed. Thus, a MPD may include a MPD as described in "ISO/IEC 23009-1:2014," currently proposed MPDs, and/or combinations thereof.

A Media Presentation as described in a MPD may include a sequence of one or more Periods, where each Period may include one or more Adaptation Sets. It should be noted that in the case where an Adaptation Set includes multiple media content components, then each media content component may be described individually. Each Adaptation Set may include one or more Representations. The properties of each media content component may be described by an AdaptationSet element and/or elements within an Adaption Set, including for example, a ContentComponent element. An audio presentation, which in some examples may be referred to as a preselection may include a set of audio components (e.g., dialog, music, effects, etc.). In ISO/IEC JTC1/SC29/WG11 MPEG2015/M37918, February 2016, San Diego, CA, US, which is incorporated by reference herein, it has been proposed to signal information associated with a preselection according to the example semantics illustrated in Table 4.5.

TABLE 4.5

| Element or Attribute Name | Use | Description |
|---|---|---|
| Preselection | | |
| @id | OD Default = 1 | specifies the id of the Preselection. This shall be unique within one bundle. |
| @audioSamplingRate | O | Either a single decimal integer value specifying the sampling rate or a whitespace separated pair of decimal integer values specifying the minimum and maximum sampling rate of the audio media component type. The values are in samples per second. If not present on any level, the value is unknown. |
| @codecs | O | specifies the codecs required to decode the Representation. The codec parameters shall also include the profile and level information where applicable. |
| @selectionPriority | OD | |
| @preselectionComponents | 1 | The list of ids of Content Components which are necessary to present the Preselection. |
| **Language** | 0 . . . N | declares a language code for this Preselection. If not present, the language code may be defined for each media component or it may be unknown. |
| **Role** | 0 . . . N | Describes the Role of the Preselection |
| **Accessibility** | 0 . . . N | Describes the accessibility features of the preselection |
| **Label** | 0 . . . N | Text label |
| **AudioChannelConfiguration** | 0 . . . N | specifies the audio channel configuration of the audio media component type. |
| **EssentialProperty** | 0 . . . N | specifies information about the containing element that is considered essential by the Media Presentation author for processing the containing element. |
| **SupplementalProperty** | 0 . . . N | specifies supplemental information about the containing element that may be used by the DASH client optimizing the processing. |
| **AudioRenderingInformation** | 0 . . . N | specifies properties that are relevant for audio rendering. |
| **ContentInteractivity** | 0 . . . N | specifies properties on the content interactivity of this pre-selection. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

As described above, a service (e.g., a linear audio/video service) may include an emergency information audio component. For example, in some cases, audio streams may include audio content associated with an emergency information displayed during the rendering of a video service (e.g., a redistribution of a video including a scrolling alert message). Further, as described above, in A/331, an emergency alert service may provide emergency alert information and may include text and associated video and/or audio content. Thus, audio streams may include audio content associated with emergency information where emergency information may be provided through one or more types of services. In the case of visually impaired users, it may be beneficial and/or necessary to include an audio presentation of emergency information in order for visually impaired users to auditorily/aurally discern the emergency information. Currently proposed audio stream property descriptors fail to provide information indicating whether an audio stream includes audio content associated with an emergency and further fail to provide information associated with audio content associated with emergency information. Failing to provide information indicating whether an audio stream includes audio content associated with an emergency and failing to provide information associated with audio content associated with an emergency may be less than ideal.

As described above, a service (e.g., a linear audio/video service) may include an audio program (which be referred to as a bundle or an audio scene) which may include a set of audio program components that may be used to form one or more audio presentations. Each audio presentation may be associated with one or more languages. For example, a presentation may include an English language director's commentary and a Spanish Language dialogue or video description. Further, a presentation may support one or more types of accessibility, e.g., visually impaired and/or hearing impaired accessibility. Currently proposed audio stream properties descriptors for the ATSC 3.0 suite of standards are less than ideal with respect to signaling language and accessibility information for a presentation.

Figure 3:
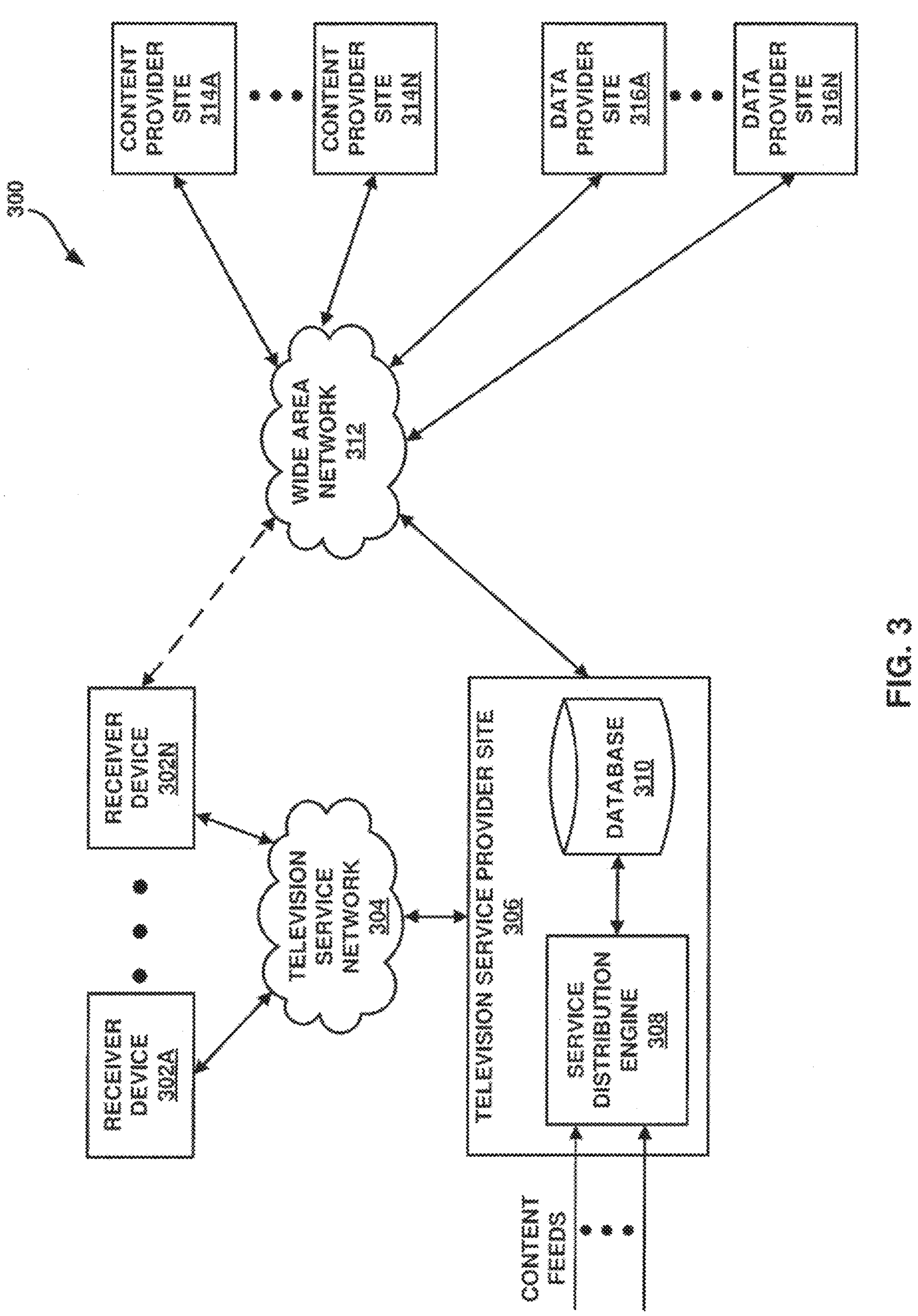
FIG. 3 is a block diagram illustrating an example of a system that may implement one or more techniques of this disclosure.

FIG. 3 is a block diagram illustrating an example of a system that may implement one or more techniques described in this disclosure. System 300 may be configured to communicate data in accordance with the techniques described herein. In the example illustrated in FIG. 3, system 300 includes one or more receiver devices 302A-302N, television service network 304, television service provider site 306, wide area network 312, one or more content provider sites 314A-314N, and one or more data provider sites 316A-316N. System 300 may include software modules. Software modules may be stored in a memory and executed by a processor. System 300 may include one or more processors and a plurality of internal and/or external memory devices. Examples of memory devices include file servers, file transfer protocol (FTP) servers, network attached storage (NAS) devices, local disk drives, or any other type of device or storage medium capable of storing data. Storage media may include Blu-ray discs, DVDs, CD-ROMs, magnetic disks, flash memory, or any other suitable digital storage media. When the techniques described herein are implemented partially in software, a device may store instructions for the software in a suitable, non-transitory computer-readable medium and execute the instructions in hardware using one or more processors.

System 300 represents an example of a system that may be configured to allow digital media content, such as, for example, a movie, a live sporting event, etc., and data and applications and media presentations associated therewith, to be distributed to and accessed by a plurality of computing devices, such as receiver devices 302A-302N. In the example illustrated in FIG. 3, receiver devices 302A-302N may include any device configured to receive data from television service provider site 306. For example, receiver devices 302A-302N may be equipped for wired and/or wireless communications and may include televisions, including so-called smart televisions, set top boxes, and digital video recorders. Further, receiver devices 302A-302N may include desktop, laptop, or tablet computers, gaming consoles, mobile devices, including, for example, "smart" phones, cellular telephones, and personal gaming devices configured to receive data from television service provider site 306. It should be noted that although system 300 is illustrated as having distinct sites, such an illustration is for descriptive purposes and does not limit system 300 to a particular physical architecture. Functions of system 300 and sites included therein may be realized using any combination of hardware, firmware and/or software implementations.

Television service network 304 is an example of a network configured to enable digital media content, which may include television services, to be distributed. For example, television service network 304 may include public over-the-air television networks, public or subscription-based satellite television service provider networks, and public or subscription-based cable television provider networks and/or over the top or Internet service providers. It should be noted that although in some examples television service network 304 may primarily be used to enable television services to be provided, television service network 304 may also enable other types of data and services to be provided according to any combination of the telecommunication protocols described herein. Further, it should be noted that in some examples, television service network 304 may enable two-way communications between television service provider site 306 and one or more of receiver devices 302A-302N. Television service network 304 may comprise any combination of wireless and/or wired communication media. Television service network 304 may include coaxial cables, fiber optic cables, twisted pair cables, wireless transmitters and receivers, routers, switches, repeaters, base stations, or any other equipment that may be useful to facilitate communications between various devices and sites. Television service network 304 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 3, television service provider site 306 may be configured to distribute television service via television service network 304. For example, television service provider site 306 may include one or more broadcast stations, a cable television provider, or a satellite television provider, or an Internet-based television provider. In the example illustrated in FIG. 3, television service provider site 306 includes service distribution engine 308 and database 310. Service distribution engine 308 may be configured to receive data, including, for example, multimedia content, interactive applications, and messages, including emergency alert messages, and distribute data to receiver devices 302A-302N through television service network 304. For example, service distribution engine 308 may be configured to transmit television services according to aspects of the one or more of the transmission standards described above (e.g., an ATSC standard). In one example, service distribution engine 308 may be configured to receive data through one or more sources. For example, television service provider site 306 may be configured to receive a transmission including television programming through a satellite uplink/downlink. Further, as illustrated in FIG. 3, television service provider site 306 may be in communication with wide area network 312 and may be configured to receive data from content provider sites 314A-314N and further receive data from data provider sites 316A-316N. It should be noted that in some examples, television service provider site 306 may include a television studio and content may originate therefrom.

Database 310 may include storage devices configured to store data including, for example, multimedia content and data associated therewith, including for example, descriptive data and executable interactive applications. For example, a sporting event may be associated with an interactive application that provides statistical updates. Data associated with multimedia content may be formatted according to a defined data format, such as, for example, Hypertext Markup Language (HTML), Dynamic HTML, eXtensible Markup Language (XML), and JavaScript Object Notation (JSON), and may include Universal Resource Locators (URLs) and Universal Resource Identifiers (URIs) enabling receiver devices 302A-302N to access data, e.g., from one of data provider sites 316A-316N. In some examples, television service provider site 306 may be configured to provide access to stored multimedia content and distribute multimedia content to one or more of receiver devices 302A-302N through television service network 304. For example, multimedia content (e.g., music, movies, and television (TV) shows) stored in database 310 may be provided to a user via television service network 304 on a so-called on demand basis.

Wide area network 312 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 312 may comprise any combination of wireless and/or wired communication media. Wide area network 312 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 316 may include the Internet.

Referring again to FIG. 3, content provider sites 314A-314N represent examples of sites that may provide multimedia content to television service provider site 306 and/or receiver devices 302A-302N. For example, a content provider site may include a studio having one or more studio content servers configured to provide multimedia files and/or streams to television service provider site 306. In one example, content provider sites 314A-314N may be configured to provide multimedia content using the IP suite. For example, a content provider site may be configured to provide multimedia content to a receiver device according to Real Time Streaming Protocol (RTSP), HTTP, or the like.

Data provider sites 316A-316N may be configured to provide data, including hypertext based content, and the like, to one or more of receiver devices 302A-302N and/or television service provider site 306 through wide area network 312. A data provider site 316A-316N may include one or more web servers. Data provided by data provider site 316A-316N may be defined according to data formats, such as, for example, HTML, Dynamic HTML, XML, and JSON. An example of a data provider site includes the United States Patent and Trademark Office website. It should be noted that in some examples, data provided by data provider sites 316A-316N may be utilized for so-called second screen applications. For example, companion device(s) in communication with a receiver device may display a website in conjunction with television programming being presented on the receiver device. It should be noted that data provided by data provider sites 316A-316N may include audio and video content.

Figure 4:
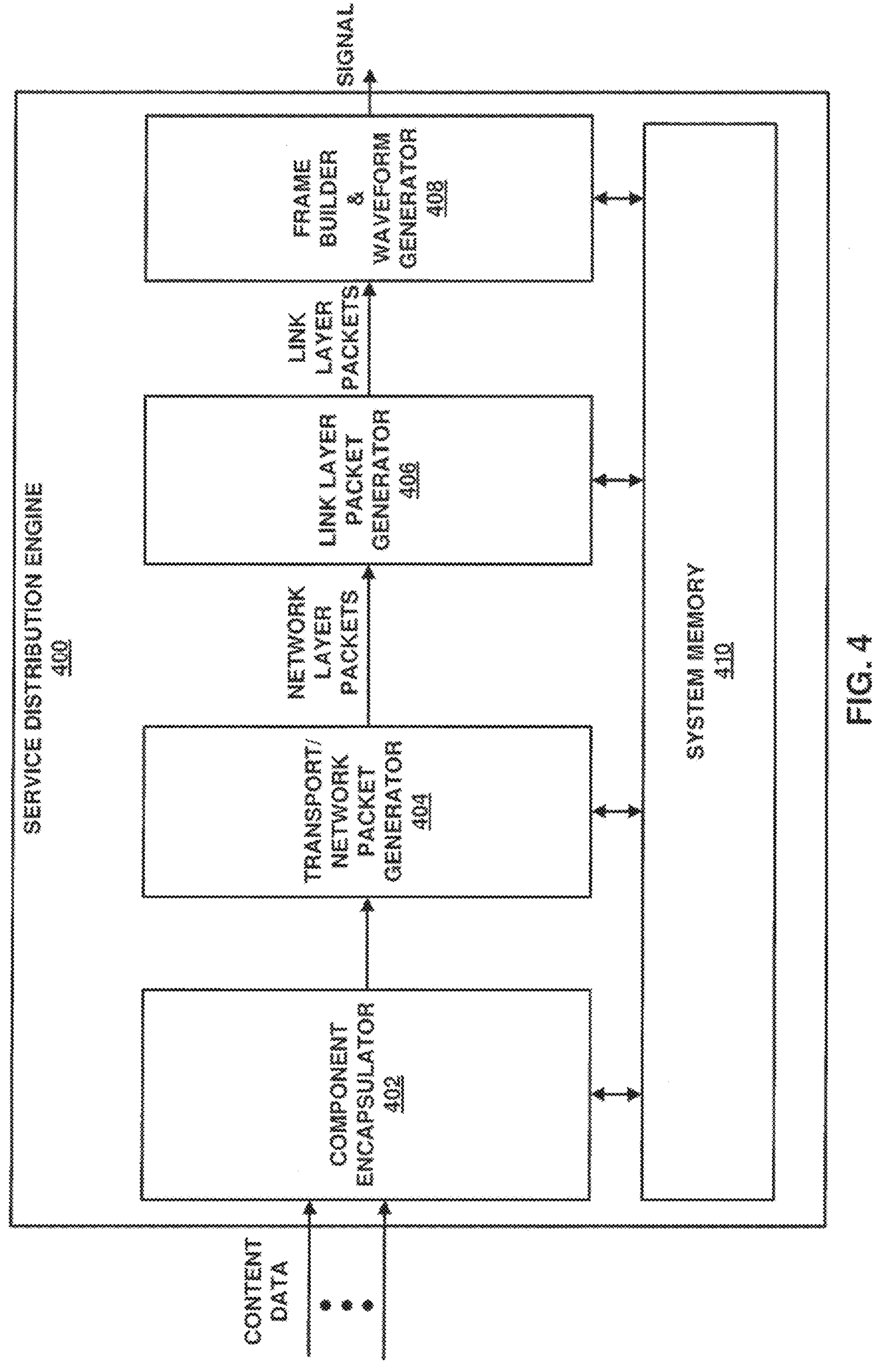
FIG. 4 is a block diagram illustrating an example of a service distribution engine that may implement one or more techniques of this disclosure.

As described above, service distribution engine 308 may be configured to receive data, including, for example, multimedia content, interactive applications, and messages, and distribute data to receiver devices 302A-302N through television service network 304. FIG. 4 is a block diagram illustrating an example of a service distribution engine that may implement one or more techniques of this disclosure. Service distribution engine 400 may be configured to receive data and output a signal representing that data for distribution over a communication network, e.g., television service network 304. For example, service distribution engine 400 may be configured to receive one or more data streams and output a signal that may be transmitted using a single radio frequency band (e.g., a 6 MHz channel, an 8 MHz channel, etc.) or a bonded channel (e.g., two separate 6 MHz channels). A data stream may generally refer to data encapsulated in a set of one or more data packets.

As illustrated in FIG. 4, service distribution engine 400 includes component encapsulator 402, transport/network packet generator 404, link layer packet generator 406, frame builder and waveform generator 408, and system memory 410. Each of component encapsulator 402, transport/network packet generator 404, link layer packet generator 406, frame builder and waveform generator 408, and system memory 410 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although service distribution engine 400 is illustrated as having distinct functional blocks, such an illustration is for descriptive purposes and does not limit service distribution engine 400 to a particular hardware architecture. Functions of service distribution engine 400 may be realized using any combination of hardware, firmware and/or software implementations.

System memory 410 may be described as a non-transitory or tangible computer-readable storage medium. In some examples, system memory 410 may provide temporary and/or long-term storage. In some examples, system memory 410 or portions thereof may be described as non-volatile memory and in other examples portions of system memory 410 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories. System memory 410 may be configured to store information that may be used by service distribution engine 400 during operation. It should be noted that system memory 410 may include individual memory elements included within each of component encapsulator 402, transport/network packet generator 404, link layer packet generator 406, and frame builder and waveform generator 408. For example, system memory 410 may include one or more buffers (e.g., First-in First-out (FIFO) buffers) configured to store data for processing by a component of service distribution engine 400.

Component encapsulator 402 may be configured to receive one or more components of a service and encapsulate the one or more components according to a defined data structure. For example, component encapsulator 402 may be configured to receive one or more media components and generate a package based on MMTP. Further, component encapsulator 402 may be configured to receive one or more media components and generate media presentation based on DASH. It should be noted that in some examples, component encapsulator 402 may be configured to generate service layer signaling data. Transport/network packet generator 404 may be configured to receive a transport package and encapsulate the transport package into corresponding transport layer packets (e.g., UDP, Transport Control Protocol (TCP), etc.) and network layer packets (e.g., Ipv4, Ipv6, compressed IP packets, etc.). Link layer packet generator 406 may be configured to receive network packets and generate packets according to a defined link layer packet structure (e.g., an ATSC 3.0 link layer packet structure).

Frame builder and waveform generator 408 may be configured to receive one or more link layer packets and output symbols (e.g., OFDM symbols) arranged in a frame structure. As described above, a frame may include one or more PLPs may be referred to as a physical layer frame (PHY-Layer frame). In one example, a frame structure may include a bootstrap, a preamble, and a data payload including one or more PLPs. A bootstrap may act as a universal entry point for a waveform. A preamble may include so-called Layer-1 signaling (L1-signaling). L1-signaling may provide the necessary information to configure physical layer parameters. Frame builder and waveform generator 408 may be configured to produce a signal for transmission within one or more of types of RF channels: a single 6 MHz channel, a single 7 MHz channel, single 8 MHz channel, a single 11 MHz channel, and bonded channels including any two or more separate single channels (e.g., a 14 MHz channel including a 6 MHz channel and a 8 MHz channel). Frame builder and waveform generator 408 may be configured to insert pilots and reserved tones for channel estimation and/or synchronization. In one example, pilots and reserved tones may be defined according to an OFDM symbol and sub-carrier frequency map. Frame builder and waveform generator 408 may be configured to generate an OFDM waveform by mapping OFDM symbols to sub-carriers. It should be noted that in some examples, frame builder and waveform generator 408 may be configured to support layer division multiplexing. Layer division multiplexing may refer to super-imposing multiple layers of data on the same RF channel (e.g., a 6 MHz channel). Typically, an upper layer refers to a core (e.g., more robust) layer supporting a primary service and a lower layer refers to a high data rate layer supporting enhanced services. For example, an upper layer could support basic High Definition video content and a lower layer could support enhanced Ultra-High Definition video content.

Figure 5A:
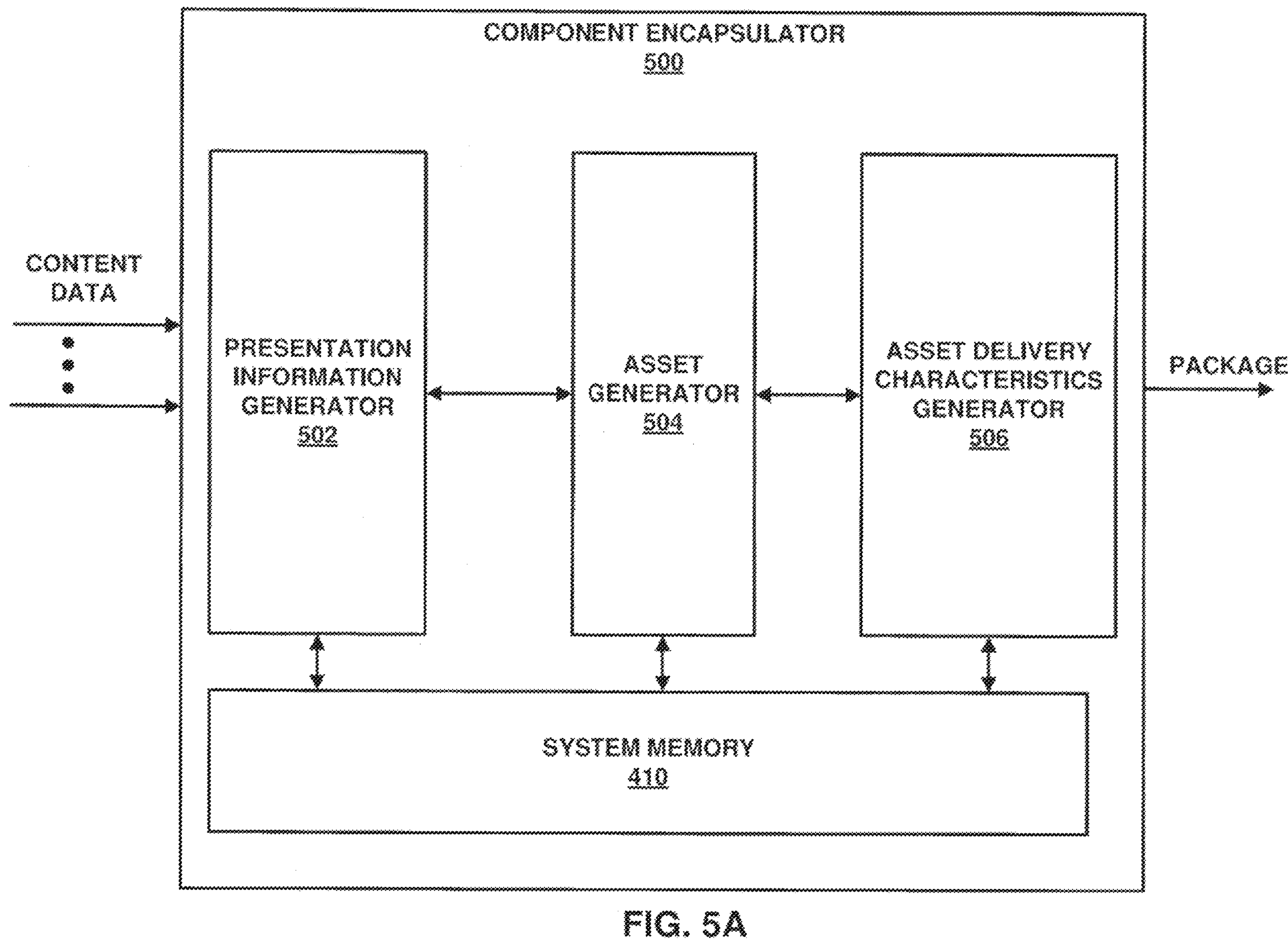
FIG. 5A is a block diagram illustrating an example of a component encapsulator that may implement one or more techniques of this disclosure.

As described above, component encapsulator 402 may be configured to receive one or more media components and generate a package based on MMTP. FIG. 5A is a block diagram illustrating an example of a component encapsulator that may implement one or more techniques of this disclosure. Component encapsulator 500 may be configured to generate a package according to the techniques described herein. In the example illustrated in FIG. 5A, functional blocks of component encapsulator 500 correspond to functional blocks for generating a package (e.g., an MMT Package). As illustrated in FIG. 5A, component encapsulator 500 includes presentation information generator 502, asset generator 504, and asset delivery characteristic generator 506. Each of presentation information generator 502, asset generator 504, and asset delivery characteristic generator 506 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although component encapsulator 500 is illustrated as having distinct functional blocks, such an illustration is for descriptive purposes and does not limit component encapsulator 500 to a particular hardware architecture. Functions of component encapsulator 500 may be realized using any combination of hardware, firmware and/or software implementations.

Asset generator 504 may be configured to receive media components and generate one or more assets for inclusion in a package. Asset delivery characteristic generator 506 may be configured to receive information regarding assets to be included in a package and provide QoS requirements. Presentation information generator 502 may be configured to generate presentation information documents. As described above, a MMT package includes presentation information (PI) and asset delivery characteristics (ADC) and a PI document may be delivered as one or more signalling messages. Thus, presentation information generator 502 may be configured to generate signalling messages according to the techniques described herein. It should be noted that in some examples, a service distribution engine (e.g., service distribution engine 308 or service distribution engine 400) or specific components thereof may be configured to generate signalling messages according to the techniques described herein. As such, description of signalling messages with respect to presentation information generator 502 should not be construed to limit the techniques described herein.

As described above, with respect to Table 2 and Table 3, A/331 does not currently define an audio stream properties descriptor and currently proposed audio stream properties descriptor are less than ideal with respect indicating whether an audio stream includes audio content associated with an emergency alert and fail to provide information associated with audio content associated with an emergency alert. Table 5A and Table 5B provide examples of syntax of an audio_stream_properties_descriptor( ) message. Table 5A and Table 5B represent general examples of an audio_stream_properties_descriptor( ) message including information indicating an audio stream includes audio content associated with an emergency alert. As describe in further detail below, in some examples, in additional to including information indicating an audio stream includes audio content associated with an emergency alert, an audio_stream_properties_descriptor( ) may include additional syntax elements, i.e., '[Additional audio stream property information]' in Table 5A and Table 5B may be associated with additional syntax elements indicating audio stream property information. Further, it should be noted that Table 5A and Table 5B include examples where emergency_information_time_info( ) structure may be included in one or more levels of syntax. For example, an audio presentation, which in some examples may be referred to as a preselection may include a set of audio components (e.g., dialog, music, effects, etc.), emergency_information_time_info( ) structure may be signaled at the presentation level and/or at the component level.

TABLE 5A

| Syntax | No. of Bits | Format |
|---|---|---|
| audio_stream_properties_descriptor( ) { | | |
| descriptor_tag | 16 | uimsbf |
| descriptor_length | 16 | uimsbf |
| ... | | |
| [Additional audio stream property information] | | |
| ... | | |
| If (emergency_information_present) { | | |
| emergency_information_start_time_present | | |
| emergency_information_end_time_present | | |
| If (emergency_information_start_time_present) { | | |
| emergency_information_start_time | 32 | uimsbf |
| reserved | 6 | '11 1111' |
| emergency_information_start_time_ms | 10 | uimsbf |
| } | | |
| If (emergency_information_end_time_present) { | | |
| emergency_information_end_time | 32 | uimsbf |
| reserved | 6 | '11 1111' |
| emergency_information_end_time_ms | 10 | uimsbf |
| } // emergency_information_time_info( ) structure | | |
| } | | |

TABLE 5B

| Syntax | No. of Bits | Format |
|---|---|---|
| audio_stream_properties_descriptor( ) { | | |
| descriptor_tag | 16 | uimsbf |
| descriptor_length | 16 | uimsbf |
| ... | | |
| [Additional audio stream property information] | | |
| ... | | |
| If (emergency_information_present) { | | |
| emergency_information_start_time_present | 1 | bslbf |
| emergency_information_end_time_present | 1 | bslbf |
| reserved | 6 | '11 1111' |
| If (emergency_information_start_time_present) { | | |
| emergency_information_start_time | 32 | uimsbf |
| reserved | 6 | '11 1111' |
| emergency_information_start_time_ms | 10 | uimsbf |
| } | | |
| If (emergency_information_end_time_present) { | | |
| emergency_information_end_time | 32 | uimsbf |
| reserved | 6 | '11 1111' |
| emergency_information_end_time_ms | 10 | uimsbf |
| } // emergency_information_time_info( ) structure | | |
| } | | |

In the examples illustrated in Table 5A and Table 5B, syntax elements 'descriptor_tag', 'descriptor_length', 'emergency_information_start_time_present', 'emergency_information_end_time_present', 'emergency_information_start_time', 'emergency_information_start_time_ms', 'emergency_information_end_time' and 'emergency_information_end_time_ms' may be based on the following example definitions:

'descriptor_tag'—This 16-bit unsigned integer shall have the value 0x0009 [or any of 0x0009~0xFFFF], identifying this descriptor as being the audio_stream_properties_descriptor( ).

'descriptor_length'—This 16-bit unsigned integer shall specify the length (in bytes) immediately following this field up to the end of this descriptor.

'emergency_information_start_time_present'—This one-bit Boolean flag shall indicate, when set to '1', that the fields "emergency_information_start_time" and "emergency_information_start_time_ms" are present. When set to '0', the fields "emergency_information_start_time" and "emergency_information_start_time_ms" shall not be present.

'emergency_information_end_time_present'—This one-bit Boolean flag shall indicate, when set to '1', that the fields "emergency_information_end_time" and "emergency_information_end_time_ms" are present. When set to '0', the fields "emergency_information_end_time" and "emergency_information_end_time_ms" shall not be present.

'emergency_information_start_time'—This 32-bit unsigned integer shall indicate the start time of the aural/audio representation of the emergency information, as the least-significant 32 bits of the count of the number of seconds since Jan. 1, 1970 00:00:00, International Atomic Time (TAI).

'emergency_information_start_time_ms'—This 10-bit unsigned integer in the range 0 to 999 shall indicate the milliseconds offset from the time indicated in emergency_information_start_time, such that the formula emergency_information_start_time+(emergency_information_start_time_ms/1000) yields the start time of the audio/aural emergency information to the nearest 1 millisecond.

'emergency_information_end_time'—This 32-bit unsigned integer shall indicate the end time of the aural/audio representation of the emergency information, as the least-significant 32 bits of the count of the number of seconds since Jan. 1, 1970 00:00:00, International Atomic Time (TAI).

'emergency_information_end_time_ms'—This 10-bit unsigned integer in the range 0 to 999 shall indicate the milliseconds offset from the time indicated in emergency_information_end_time, such that the formula emergency_information_end_time+(emergency_information_end_time_ms/1000) yields the end time of the audio/aural emergency information to the nearest 1 millisecond.

It should be noted that in some examples, the values of 'emergency_information_start_time_present' and/or 'emergency_information_end_time_present' may be inferred. For example, in one example each of 'emergency_information_start_time_present' and/or 'emergency_information_end_time_present' may not be signalled and inferred to be zero. For example, the values may be inferred from signalling occurring at another level. For example, a syntax may be used where for syntax elements that are not included their value is inferred to be zero. In one example, 'emergency_information_start_time_present' and 'emergency_information_end_time_present' may be based on the following definitions: 'emergency_information_start_time_present'—This one-bit Boolean flag shall indicate, when set to '1', that the fields "emergency_information_start_time" and "emergency_information_start_time_ms" are present. When set to '0', the fields "emergency_information_start_time" and "emergency_information_start_time_ms" shall not be present and the start time of the aural/audio representation of the emergency information shall be inferred to be equal to the presentation time of first media sample in presentation order in the audio asset. [where sample includes an ISOBMFF (ISO Base Media File Format) sample and is defined as: all the data associated with a single timestamp].

'emergency_information_end_time_present'—This one-bit Boolean flag shall indicate, when set to '1', that the fields "emergency_information_end_time" and "emergency_information_end_time_ms" are present. When set to '0', the fields "emergency_information_end_time" and "emergency_information_end_time_ms" shall not be present and the end time of the aural/audio representation of the emergency information shall be inferred to be equal to the presentation time of the last media sample in presentation order in the audio asset, [where sample includes an ISOBMFF sample].

It should be noted that information signaled using emergency_information_time_info( ) structure may be particularly useful for enabling splicing and processing (e.g. mixing, replacement) of audio/aural representation of emergency information at one or more locations in system 300. It should be noted that in other examples, other formats may be used to signal time values e.g., a 64-bit Network Time Protocol (NTP) timestamp value, etc.

It should be noted that with respect to Table 5A and Table 5B, the condition "If (emergency_information_present)" may be determined based on one or more syntax elements included in an audio_stream_properties_descriptor( ), for example, in one example, an audio_stream_properties_descriptor( ) may include a syntax element 'emergency_information_present_flag', where 'emergency_information_present_flag' is based on the following example definition:

'emergency_information_present_flag'—A 1-bit flag, when set to '1' indicates that the audio asset contains an audio/aural representation of emergency information and that the elements in the emergency_information_time_info( ) structure are present. When set to '0' indicates that the audio asset does not contain an audio/aural representation of emergency information and that the elements in the emergency_information_time_info( ) structure are not present.

In one example, an audio_stream_properties_descriptor( ) may include a preselection information. Table 6 provides an example of preselection_info( ).

TABLE 6

| Syntax | No. of Bits | Format |
|---|---|---|
| preselection_info( ) { | | |
| num_preselections | 7 | uimsbf |
| reserved | 1 | '1' |
| for(k=0; k< num_preselections; k++) { | | |
| preselection_id | 7 | uimbsf |
| label_present | 1 | bslbf |
| primary_language_length | 8 | uimbsf |
| for (j=0; j<language_length; j++) { | | |
| primary_language_byte | 8 | uimsbf |
| } | | |
| accessibility | 8 | uimsbf |
| role | 8 | uimsbf |
| if (label_present) { | | |
| label_length | 8 | uimsbf |
| for(l=0; l< label_length; l++) { | | |
| label_data_byte | 8 | uimbsf |
| } | | |
| } | | |
| emergency_information_present_flag | 1 | bslbf |
| reserved | 7 | '111 1111' |
| } | | |
| } | | |

In the example illustrated in Table 6, syntax elements 'num_preselections', 'preselection_ID', 'label_present', 'primary_language_length', 'primary_language', 'accessibility', 'role', 'label_length', 'label_data_byte', and 'emergency_information_present_flag' may be based on the following example definitions:

'num_preselections'—This 7-bit unsigned integer field shall indicate the number of Preselections that are available within the main stream and all auxiliary streams.

'preselection_ID'—This 7-bit unsigned integer field shall identify the ID of this Preselection.

'label_present'—This 1-bit Boolean flag shall indicate, when set to '1', that a text label for this Preselection is present. When set to '0', this flag shall indicate that the text label for this Preselection is not present.

'primary_language_length'—An 8-bit unsigned integer field that shall specify the length in bytes of the primary language supported in the Preselection.

'primary_language_byte'—An 8-bit unsigned integer field that shall contain a UTF-8 character of the language of the primary audio dialogue component in this Preselection. The primary language of the Preselection shall be given by a language tag as defined by IETF BCP 47 [Internet Engineering Task Force (IETF) Best Current Practice (BCP) 47 published September 2009], where a UTF-8 character may be defined based on the following definition: UTF-8 is a character encoding capable of encoding all possible characters, or code points, in Unicode. The encoding is variable-length and uses 8-bit code units. The name is derived from: Universal Coded Character Set+Transformation Format-8-bit.

'accessibility'—This 8-bit unsigned integer field shall identify the accessibility support for this Preselection. Accessibility support is signaled for the primary language in this Preselection. If the stream contains audio components for accessibility support, this is signaled with the following values for this field: 0=no accessibility support, 1=Visually Impaired, 2=Hearing Impaired, 3=Visually and Hearing Impaired, 255=unknown. The values 4 to 254 are reserved.

'role'—This 8-bit unsigned integer field shall indicate the role of the Preselection.

'label_length'—This 8-bit unsigned integer field shall specify the length in bytes of this Preselection text label.

'label_data_byte'—An 8-bit unsigned integer field that shall contain a byte of the Preselection text label.

'emergency_information_present_flag'—A 1-bit flag, when set to 'l' indicates that the Preselection contains an audio/aural representation of emergency information. When set to '0' indicates that the Preselection does not contain an audio/aural representation of emergency information.

It should be noted that in some examples, 'emergency_information_present_flag' in Table 6 may indicate whether the elements in the emergency_information_time_info( ) structure are present. It should be noted that in one example, syntax element 'role' may indicate a role based on the code values provided in Table 7A and in one example may indicate a role based on the code values provided in Table 7B.

TABLE 7A

| role | Meaning |
|---|---|
| 0x00 | main |
| 0x01 | alternate |
| 0x02 | commentary |
| 0x03 | video description |
| 0x04 | emergency information |
| 0x05~0xFF | reserved for future use |

TABLE 7B

| role | Meaning |
|---|---|
| 0x00 | Main-complete main |
| 0x01 | Main-music and effects |
| 0x02 | alternate |
| 0x03 | commentary |
| 0x04 | video description |
| 0x05 | emergency information |
| 0x06~0xFF | reserved for future use |

As illustrated in Table 7A and Table 7B syntax element 'role' may be used to indicate that an audio stream corresponds to emergency information. Thus, in some examples the condition "If (emergency_information_present)" in Table 5 may be determined based on a value of 'role'. Further, it should be noted that in some examples syntax element 'role' may be present in audio_stream_properties_descriptor( ) in syntax other than preselection_info( ), e.g., in the line before, "If (emergency_information_present)" condition in Table 5. Further, it should be noted that in some examples, values of syntax element 'accessibility' may be used to determine the "If (emergency_information_present)" condition. It should be noted that in some examples, syntax element 'role' may indicate a role based on the code values provided in Table 7C.

TABLE 7C

| role | Meaning |
|---|---|
| 0x00 | Main-complete main |
| 0x01 | Main-music and effects |
| 0x02 | alternate |
| 0x03 | commentary |
| 0x04 | video description |
| 0x05~0xFF | reserved for future use |

As described above. '[Additional audio stream property information]' in Table 5 may may be associated with additional syntax elements indicating audio stream property information. Table 8A provides an example of an audio_stream_properties_descriptor( ) including additional syntax elements.

TABLE 8A

| Syntax | No. of Bits | Format |
|---|---|---|
| audio_stream_properties_descriptor( ) { | | |
| descriptor_tag | 16 | uimsbf |
| descriptor_length | 16 | uimsbf |
| number_of_assets | 8 | uimsbf |
| for (i=0;i<number_of_assets;i++) { | | |
| asset_id_length | 8 | uimsbf |
| for (j=0; j<asset_id_length; j++) { | | |
| asset_id_byte | 8 | uimsbf |
| } | | |
| codec_code | 4*8 | uimsbf |
| profile_level_indication | 8 | uimsbf |
| audio_channel_configuration | 6 | uimsbf |
| interactivity_enabled | 1 | bslbf |
| reserved | 1 | '1' |
| if (audio_channel_configuration == 0) | | |
| { | | |
| channel_layout_indication | 2 | uimsbf |
| reference_channel_layout | 6 | uimsbf |
| } | | |
| preselection_info_present | 1 | bslbf |
| multi-stream_info_present | 1 | bslbf |
| reserved | 6 | '111111' |
| if (preselection_info_present) { | | |

TABLE 8A-continued

| Syntax | No. of Bits | Format |
|---|---|---|
| preselection_info( ) | | Table 6 |
| } | | |
| if (multi-stream_info_present) { | | |
| multi-stream_info( ) | | Table 10 |
| } | | |
| primary_language_length | 8 | uimbsf |
| for (k=0; k<language_length; k++) { | | |
| primary_language_byte | 8 | uimsbf |
| } | | |
| accessibility | 8 | uimbsf |
| num_additional_languages | 8 | uimbsf |
| for(l=0; l< num_additional_languages; l++) { | | |
| additional_language_length | 8 | uimbsf |
| for (m=0; m<language_length; m++) { | | |
| additional_language_byte | 8 | uimsbf |
| } | | |
| accessibility | 8 | uimbsf |
| } | | |
| emergency_information_present_flag | 1 | bslbf |
| reserved | 7 | '111 1111' |
| emergency_information_time_ info( ) | | Table 5A or Table 5B |
| } | | |
| } | | |

In the example illustrated in Table 8A, syntax elements 'descriptor_tag' and 'descriptor_length', and 'emergency_information_present_flag' may be based on the definitions provided above. Syntax elements 'number_of_assets', 'asset_id_length', 'asset_id_byte', 'codec_code', 'profile_level_indication', 'audio_channel_configuration', 'channel_layout_indication', 'reference_channel_layout', 'interactivity_enabled', 'preselection_info_present', 'multi_stream_info_present', 'primary_language_length', 'primary_language_byte', 'num_additional_languages', 'additional_language_length', 'additional_language_byte', 'accessibility', and 'emergency_information_present_flag' may be based on the following example definitions:

'number_of_assets'—An 8-bit unsigned integer field that shall specify the number of audio assets described by this descriptor.

'asset_id_length'—This 8-bit unsigned integer field shall specify the length in bytes of the audio asset id.

'asset_id_byte'—An 8-bit unsigned integer field that shall contain a byte of the audio asset id.

'codec_code'—This 32-bit unsigned integer field shall specify a 4-character code for a codec.

'profile_level_indication'—This 8-bit unsigned integer field shall indicate the audio profile and level of the associated audio stream.

'audio_channel_configuration'—This 6-bit unsigned integer field shall indicate the audio channel configuration of the encoded audio stream. If this field is '0', the encoded audio may contain a combination of audio elements that are not channel-based, e.g. audio objects, so that a single audio_channel_configuration value is not meaningful.

It should be noted that in some examples, for audio channel configurations there may be one or more corresponding schemes. In this manner, in some examples a corresponding syntax element indicating a scheme may be signaled.

'channel_layout_indication'—This 2-bit unsigned integer field may contain a hint for a preferred reproduction channel layout, if audio_channel_configuration is set to '0'. Values of channel_layout_indication shall be as specified in Table 9. Note that the following field reference_channel_layout may be used to signal a specific preferred reproduction channel layout.

TABLE 9

| channel_layout_indication value | Meaning |
|---|---|
| '00' | There is no preference given for the reproduction channel layout. |
| '01' | The content is pre-rendered for consumption with headphones. In this case, the following field reference_channel_layout shall be set to '0'. |
| '10' | The content has only elements to be rendered in a plane, i.e. the preferred reproduction channel layout is a two-dimensional layout |
| '11' | the content has elements with heights, i.e. the preferred reproduction channel layout is a three-dimensional layout |

'reference_channel_layout'—For values other than '0', this 6-bit unsigned integer field shall identify the reference channel configuration that describes the loudspeaker layout for which the content of the present audio stream was originally designed or produced. In that sense it represents the optimal loudspeaker layout from the content creator's perspective.

'interactivity_enabled'—This 1-bit Boolean flag shall indicate, when set to '1', that the audio stream contains elements with associated metadata, which enable user interactivity. When set to '0', the flag shall indicate that no user interactivity of any kind is available. This flag may be used to determine the need for initializing a user interface for audio interactivity.

'preselection_info_present'—This 1-bit Boolean flag shall indicate, when set to '1', that the elements in the preselection_info( ) structure are present. When set to '0', this flag shall indicate that the elements in the preselection_info( ) structure are not present.

'multi_stream_info_present'—This 1-bit Boolean flag shall indicate, when set to '1', that the elements in the multi_stream_info( ) structure are present and that the stream is part of a bundle of streams that together form an audio program. When set to '0', this flag shall indicate that the elements in the multi_stream_info( ) structure are not present and that the audio stream is a self-contained complete main stream.

'primary_language_length'—An 8-bit unsigned integer field that shall specify the length in bytes of the primary language supported in the audio asset.

'primary_language_byte'—An 8-bit unsigned integer field that shall contain a UTF-8 character of the the language of the primary audio dialogue component. The primary language of an audio asset shall be given by a language tag as defined by IETF BCP 47].

'num_additional_languages'—This 8-bit unsigned integer field shall specify the number of additional languages that are available within this stream. If this field is set to '0', then no additional languages are available.

'additional_language_length'—An 8-bit unsigned integer field that shall specify the length in bytes of the additional language supported in the audio asset.

'additional_language_byte'—An 8-bit unsigned integer field that shall contain a UTF-8 character of the the language of an additional audio dialogue component that is available in the audio stream. The additional language of an audio asset shall be given by a language tag as defined by IETF BCP 47.

'accessibility'—This 8-bit unsigned integer field shall identify the accessibility support carried in this audio stream. Accessibility support is signaled for the primary language and, if available, for each additional language. If the stream contains audio components for accessibility support, this is signaled with the following values for this field: 0=no accessibility support, 1=Visually Impaired, 2=Hearing Impaired, 3=Visually and Hearing Impaired, 255=unknown. The values 4 to 254 are reserved.

'emergency_information_present_flag'—A 1-bit flag, when set to '1' indicates that the audio asset contains an audio/aural representation of emergency information and that the elements in the emergency_information_time_info( ) structure are present. When set to '0' indicates that the audio asset does not contain an audio/aural representation of emergency information and that the elements in the emergency_information_time_info( ) structure are not present.

In the example illustrated in Table 8A, 'multi-stream_info( )' may be based on example syntax provided in Table 10.

TABLE 10

| Syntax | No. of Bits | Format |
|---|---|---|
| multi-stream_info( ) { | | |
| this_is_main_stream | 1 | bslbf |
| this_stream_id | 7 | uimsbf |
| reserved | 1 | '1' |
| bundle_id | 7 | uimsbf |
| if (this_is_main_stream) { | | |
| reserved | 1 | '1' |
| num_auxiliary_streams | 7 | uimbsf |
| for(m=0; m< num_auxiliary_streams;m++) | | |
| { | | |

TABLE 10-continued

| Syntax | No. of Bits | Format |
|---|---|---|
| delivery_method | 1 | bslbf |
| auxiliary_stream_id | 7 | uimbsf |
| } | | |
| } | | |
| } | | |

In the example illustrated in Table 10, syntax elements 'this_is_main_stream', 'this_stream_id', 'bundle_id', 'num_auxiliary_streams', 'delivery_method', and 'auxiliary_stream_id' may be based on the following example definitions:

'this_is_main_stream'—This 1-bit Boolean flag shall indicate, when set to '1', that this stream contains a main stream that can be presented on its own, or that can be combined with additional audio components from an auxiliary stream. When set to '0', this flag shall indicate that this stream contains an auxiliary stream.

'this_stream_id'—This 7-bit unsigned integer field shall indicate the ID of this audio stream. This ID shall be unique within one bundle, i.e., for all streams that have the same bundle_id.

'bundle_id'—This 7-bit unsigned integer field shall identify a unique ID for one bundle of audio streams. A bundle consists of exactly one main stream and one or more additional auxiliary streams that shall have the same bundle_id. The auxiliary streams contain additional audio components that can be combined with the main stream. The auxiliary streams can be delivered via broadband or broadcast. The main stream shall always be delivered via broadcast and signaled within this audio_stream_properties_descriptor( ) with 'this_is_main_stream' set to '1'.

'num_auxiliary_streams'—This 7-bit unsigned integer field shall indicate the number of auxiliary streams that are available on broadband or broadcast to be combined with the main stream.

'delivery_method'—This 1-bit Boolean flag shall indicate, when set to '1', that the corresponding auxiliary stream is delivered using DASH on HTTP. Access information to locate the stream is given in the DASH MPD. When set to '0', this flag shall indicate that the corresponding auxiliary stream is delivered using MMT, signaled within the same audio_stream_properties_descriptor( ) and located through the asset id signaled for this stream.

'auxiliary_stream_id'—This 7-bit unsigned integer field shall identify the ID of the auxiliary stream. The ID of all auxiliary streams shall be unique within one bundle.

It should be noted that with respect to Table 8A and/or Table 8B, emergency_information_time_info( ) may be signaled at the asset level and/or at the preselection level and/or at the (primary and/or additional) language level. In one example, when emergency_information_time_info( ) is signaled at the preselection level its presence may be controlled by the value of corresponding flag/indication e.g. emergency_information_present_flag included at the preselection level, role included at the preselection level, accessibility included at the language level. In one example, audio/aural representation of emergency information start/end time and signaling indicating its presence may be included at the (primary and/or additional) language level only for assets. In one example, audio/aural representation of emergency information start/end time and signaling indicating its presence may be included at the (primary and/or additional) language level only for preselection. In one example IETF BCP 47 may corresponds to IETF Request For Comments (RFC) 5646. It should be noted that in some examples, in the case where emergency_information_time_info( ) is included in preselection_info( ) the values of 'emergency_information_start_time_present' and 'emergency_information_end_time_present' may be inferred. In one example, 'emergency_information_start_time_present' and 'emergency_information_end_time_present' included in preselection_info( ) may be based on the following definitions:

- 'emergency_information_start_time_present'—This one-bit Boolean flag shall indicate, when set to '1', that the fields "emergency_information_start_time" and "emergency_information_start_time_ms" are present. When set to '0', the fields "emergency_information_start_time" and "emergency_information_start_time_ms" shall not be present and the start time of the aural/audio representation of the emergency information shall be inferred to be equal to the presentation time of first media sample in presentation order in the audio presentation [where sample includes an ISOBMFF sample].
- 'emergency_information_end_time_present'—This one-bit Boolean flag shall indicate, when set to '1', that the fields "emergency_information_end_time" and "emergency_information_end_time_ms" are present. When set to '0', the fields "emergency_information_end_time" and "emergency_information_end_time_ms" shall not be present and the end time of the aural/audio representation of the emergency information shall be inferred to be equal to the presentation time of the last media sample in presentation order in the audio presentation [where sample includes an ISOBMFF sample].

As described above, with respect to Table 3. A/331 does not currently define an audio stream properties descriptor and currently proposed audio stream properties descriptor are less than ideal with respect to with respect to signaling language and accessibility information for a presentation.

Table 11 provide examples of syntax of an audio_stream_properties_descriptor( ) message that may be generated by a service distribution engine and parsed by a receiver device according to one or more techniques of this disclosure.

TABLE 11

| Syntax | No. of Bits | Format |
|---|---|---|
| audio_stream_properties_descriptor( ) { | | |
| descriptor_tag | 16 | uimsbf |
| descriptor_length | 16 | uimsbf |
| number_of_assets | 8 | uimsbf |
| for (i=0; i<number_of_assets; i++) { | | |
| asset_id_length | 8 | uimsbf |
| for (j=0; j<asset_id_length; j++) { | | |
| asset_id_byte | 8 | uimsbf |
| } | | |
| codec_code | 4*8 | uimsbf |
| number_of_presentations | 8 | uimsbf |
| multi-stream_info_present | 1 | bslbf |
| emergency_info_time_present | 1 | bslbf |
| reserved | 6 | '111111' |
| for (j=0; j<number_of_presentations; j++) { | | |
| presentation_id | 8 | uimbsf |
| interactivity_enabled | 1 | bslbf |
| profile_channel_conf_present | 1 | bslbf |
| audio_rendering_info_present | 1 | bslbf |
| language_present | 1 | bslbf |
| accessibility_role_present | 1 | bslbf |

TABLE 11-continued

| Syntax | No. of Bits | Format |
|---|---|---|
| label_present | 1 | bslbf |
| reserved | 2 | '11' |
| if (profile_channel_conf_present) { | | |
| if (codec_code == 'ac-4') { | | |
| profile_level_indication | 3*8 | uimsbf |
| audio_channel_configuration | 3*8 | uimsbf |
| } | | |
| else { | | |
| profile_level_indication | 8 | uimsbf |
| audio_channel_configuration | 6 | uimsbf |
| reserved | 2 | '11' |
| } | | |
| } | 1 | bslbf |
| if (audio_rendering_info_present) { | | |
| channel_layout_indication | 2 | uimsbf |
| reserved | 6 | '111111' |
| } | | |
| if (language_present) { | | |
| num_languages_minus1 | 8 | uimbsf |
| for(k=0; k< num_languages_minus1+1; k++) | | |
| { | | |
| language_length | 8 | uimbsf |
| for (l=0; l< language_length; l++) { | | |
| language_byte | 8 | uimbsf |
| } | | |
| } | | |
| } | | |
| if (accessibility_role_present) { | | |
| for(k=0; k< num_languages_minus1+1; k++) | | |
| { | | |
| accessibility | 8 | uimbsf |
| } | | |
| role | 8 | uimbsf |
| } | | |
| if (label_present) { | | |
| label_length | 8 | uimbsf |
| for(k=0; k< label_length; k++) { | | |
| label_data_byte | 8 | uimbsf |
| } | | |
| } | | |
| if (multi-stream_info_present) { | | |
| presentation_aux-stream_info( ) | | Table 16 |
| } | | |
| } /* end of for number_of_presentations loop*/ | | |
| if (multi-stream_info_present) { | | |
| multi-stream_info( ) | | Table 15 |
| } | | |
| if (emergency_info_time_present) { | | |
| emergency_information_time_info( ) | | Table 14 |
| } | | |
| } | | |
| } | | |

In one example syntax elements 'descriptor_tag', 'descriptor_length', 'number_of_assets', 'asset_id_length', 'asset_id_byte', 'codec_code', 'num_of_presentations', 'multi_stream_info_present', 'emergency_info_time_present', 'presentation_id', 'interactivity_enabled', 'profile_channel_conf_present', 'audio_rendering_info_present', 'language_present', 'accessibility_role_present', 'label_present', 'profile_level_indication', 'audio_channel_configuration', 'channel_layout_indication', 'num_languages_minus1', 'language_length', 'language_byte', 'accessibility', 'role', 'label_length', and 'label_data_byte' illustrated in Table 11 may be based on the following example definitions:

- 'descriptor_tag'—A 16-bit unsigned integer field that shall have the value 0x0009, identifying this descriptor as the audio_stream_properties_descriptor( ).
- 'descriptor_length'—A 16-bit unsigned integer field that shall specify the length (in bytes) immediately following this field up to the end of this descriptor.

'number_of_assets'—An 8-bit unsigned integer field that shall specify the number of audio assets described by this descriptor.

'asset_id_length'—An 8-bit unsigned integer field that shall specify the length in bytes of the audio asset id.

'asset_id_byte'—An 8-bit unsigned integer field that shall contain a byte of the audio asset id.

'codec_code'—A 32-bit unsigned integer field that shall specify a 4-character code for a codec.

'number_of_presentations'—An 8-bit unsigned integer field that shall indicate the number of Presentations that are available within the main stream and all auxiliary streams. The minimum number of num_presentations shall be '1' for the main stream. For auxiliary streams num_presentations shall have the value '0' so that for auxiliary streams no presentation information is present in the descriptor.

'multi_stream_info_present'—A 1-bit Boolean flag that shall indicate, when set to '1', that the elements in the multi_stream_info( ) structure are present and that the stream is part of a bundle of streams that together form an audio program. When set to '0', this flag shall indicate that the elements in the multi_stream_info( ) structure are not present and that the audio stream is a complete main stream that contains all audio components of all presentations.

'emergency_info_time_present'—A 1-bit Boolean flag that when set to '1' shall indicate that the elements in the emergency_information_time_info( ) structure are present. And that when set to '0' shall indicate that the elements in the emergency_information_time_info( ) structure are not present. The value of this field shall be equal to '0' when none of the Presentations in the audio asset contain an audio/aural representation of the emergency information.

'presentation_id'—An 8-bit unsigned integer field that shall identify the ID of this Presentation. The first presentation in the loop shall be the default Presentation.

'interactivity_enabled'—A 1-bit Boolean flag that shall indicate, when set to '1', that the audio presentation contains elements with associated metadata, which enable user interactivity. When set to '0', the flag shall indicate that no user interactivity of any kind is available. This flag may be used to determine the need for initializing a user interface for audio interactivity.

'profile_channel_conf_present'—A 1-bit Boolean flag that shall indicate, when set to '1', that profile and channel configuration information for this Presentation is present. When set to '0', this flag shall indicate that no profile and channel configuration information for this Presentation is present. The profile_channel_conf_present flag shall be always set to '1' for the default presentation.

'audio_rendering_info_present'—A 1-bit Boolean flag that shall indicate, when set to '1', that additional audio rendering info for this Presentation is present. When set to '0', this flag shall indicate that no additional audio rendering info for this Presentation is present.

'language_present'—A 1-bit Boolean flag that shall indicate, when set to '1', that language information for this Presentation is present. When set to '0', this flag shall indicate that no language information for this Presentation is present.

'accessibility_role_present'—A 1-bit Boolean flag that shall indicate, when set to '1', that accessibility and role information for this Presentation is present. When set to '0', this flag shall indicate that no accessibility and role information for this Presentation is present.

'label_present'—A 1-bit Boolean flag that shall indicate, when set to '1', that a text label for this Presentation is present. When set to '0', this flag shall indicate that the text label for this Presentation is not present.

'profile_level_indication'—This field shall indicate the audio profile and level of the associated presentation, i.e. it indicates the complexity and decoder requirements.

'audio_channel_configuration'—This field that shall indicate the audio channel configuration of the encoded audio stream. A value of '0' indicates that a single audio_channel_configuration value is not meaningful, because the encoded audio e.g. contains a combination of audio elements that are not channel-based, like audio objects that could be rendered to positions/coordinates independent from speaker configurations. Instead, the following field channel_layout_indication may be used to retrieve some meaningful information about the available rendering options.

'channel_layout_indication'—A 2-bit unsigned integer field that may contain a hint for a preferred reproduction channel layout, if audio_channel_configuration is set to '0'. Values of channel_layout_indication shall be as specified in Table 12.

TABLE 12

| channel_layout_indication value | Meaning |
|---|---|
| '00' | There is no preference given for the reproduction channel layout. |
| '01' | The content is pre-rendered for consumption with headphones. In this case, the following field reference_channel_layout shall be set to '0'. |
| '10' | The content has only elements to be rendered in a plane, i.e. the preferred reproduction channel layout is a two-dimensional layout |
| '11' | the content has elements with heights, i.e. the preferred reproduction channel layout is a three-dimensional layout |

'num_languages_minus1'—An 8-bit unsigned integer field plus 1 that shall specify the number of languages that are available within this Presentation. When not present the value of num_languages_minus1 shall be inferred to be equal to 0.

'language_length'—An 8-bit unsigned integer field that shall specify the length in bytes of each language supported in the Presentation. The first language in the loop (k is equal to 0) shall be the primary language for the Presentation. The remaining language(s) in the loop (k is not equal to 0) shall indicate the additional language(s) available in the Presentation. In some examples, a primary language may include a default language for a service and/or may correspond to an official or most common (e.g., as determined by number of speakers) for a region (e.g., a country, a territory, or the like).

'language_byte'—An 8-bit unsigned integer field that shall contain a UTF-8 character of the (k-th) language of each audio dialogue component in this Presentation. The language of the Presentation shall be given by a language tag as defined by IETF BCP 47 (Internet Engineering Task Force (IETF) Best Current Practice (BCP) 47) [BCP 47, September 2009]. It should be noted that BCP is a persistent name for a series of IETF Request for Comments (RFC) whose numbers change as they are updated. The latest RFC describing language tag syntax is RFC 5646, Tags for the Identification of Languages, which is incorporated by reference herein, and it obsoletes the older RFCs 4646, 3066 and 1766. In RFC 5646, the length of value of xml:lang is variable. It should be noted that in other examples, other language tags may be used.

In one another example, language_byte may be based on the following example definition:

'language_byte'—An 8-bit unsigned integer field that shall contain a UTF-8 character of the (k-th) language of the Presentation. The language of the Presentation shall be given by a language tag as defined by IETF BCP 47 (Internet Engineering Task Force (IETF) Best Current Practice (BCP) 47) [BCP 47, September 2009]. It should be noted that BCP is a persistent name for a series of IETF Request for Comments (RFC) whose numbers change as they are updated. The latest RFC describing language tag syntax is RFC 5646, Tags for the Identification of Languages, which is incorporated by reference herein, and it obsoletes the older RFCs 4646, 3066 and 1766. In RFC 5646, the length of value of xml:lang is variable. It should be noted that in other examples, other language tags may be used.

'accessibility'—An 8-bit unsigned integer field that shall identify the accessibility support for each language this Presentation. Accessibility support is signaled for each language in this Presentation. The k-th occurrence of accessibility element in this accessibility "for" loop shall indicate the accessibility information for k-th language in the language "for" loop above. Table 13 specifies the bit used to indicate if the Presentation contains support for a particular audio accessibility service. When the bit specified in Table 13 is set to '1' it indicates the Presentation contains the corresponding audio accessibility service. When the bit specified in Table 13 is set to '0' it indicates the Presentation does not contain the corresponding audio accessibility service.

TABLE 13

| Bit | Audio Accessibility Service |
|---|---|
| 0 (MSB) | For Visually Impaired |
| 1 | For Hearing Impaired |
| 2 | Audio/Aural representation of Emergency Information |
| 3-7 | reserved |

Note:
Bit 0, which indicates the presence of the audio accessibility service for visually impaired for the Presentation is the MSB of the accessibility field. For example, to indicate that the Presentation contains audio accessibility service for Visually Impaired as well as aural/audio representation of emergency information, the value of the accessibility field would be 0xBF (the hexadecimal equivalent of the binary value 1011 1111).

'label_length'—An 8-bit unsigned integer field that shall specify the length in bytes of this Presentation text label.

'label_data_byte'—An 8-bit unsigned integer field that shall contain a byte of the Presentation text label.

It should be noted that in the example illustrated in Table 11, the syntax provided for specify the number of languages that are available within a presentation and identifying each language in a presentation may be particularly useful for efficiently indicating a language of a primary dialogue of a service and indicating languages of one or more additional audio dialogue components. Further, the syntax for specifying accessibility support for each language with a presentation may be particularly useful for efficiently indicating accessibility support.

As illustrated in Table 11, example syntax for 'emergency_information_time_info( )' is illustrated in Table 14.

TABLE 14

| Syntax | No. of Bits | Format |
|---|---|---|
| emergency_information_time_info( ) { | | |
| emergency_information_start_time_present | 1 | bslbf |
| emergency_information_end_time_present | 1 | bslbf |
| reserved | 6 | '11 1111' |
| If (emergency_information_start_time_present) { | | |
| emergency_information_start_time | 32 | uimsbf |
| reserved | 6 | '11 1111' |
| emergency_information_start_time_ms | 10 | uimsbf |
| } | | |
| If (emergency_information_end_time_present) { | | |
| emergency_information_end_time | 32 | uimsbf |
| reserved | 6 | '11 1111' |
| emergency_information_end_time_ms | 10 | uimsbf |
| } | | |
| } | | |

In one example syntax elements 'emergency_information_start_time_present', 'emergency_information_end_time_present', 'emergency_information_start_time', 'emergency_information_start_time_ms', 'emergency_information_end_time', and 'emergency_information_end_time_ms' in Table 13 may be based on the following example definitions:

'emergency_information_start_time_present'—A 1-bit Boolean flag that shall indicate, when set to '1', that the fields emergency_information_start_time and emergency_information_start_time_ms are present. When set to '0', the fields emergency_information_start_time and emergency_information_start_time_ms shall not be present and the start time of the aural/audio representation of the emergency information shall be inferred to be equal to the presentation time of first media sample in presentation order in the audio asset.

'emergency_information_end_time_present'—A 1-bit Boolean flag that shall indicate, when set to '1', that the fields emergency_information_end_time and emergency_information_end_time_ms are present. When set to '0', the fields emergency_information_end_time and emergency_information_end_time_ms shall not be present and the end time of the aural/audio representation of the emergency information shall be inferred to be equal to the presentation time of the last media sample in presentation order in the audio asset.

'emergency_information_start_time'—A 32-bit unsigned integer that shall indicate the start time of the aural/audio representation of the emergency information, as the least-significant 32 bits of the count of the number of seconds since Jan. 1, 1970 00:00:00, International Atomic Time (TAI).

'emergency_information_start_time_ms'—A 10-bit unsigned integer in the range 0 to 999 that shall indicate the milliseconds offset from the time indicated in emergency_information_start_time, such that the formula emergency_information_start_time+(emergency_information_start_time_ms/1000) yields the start time of the audio/aural emergency information to the nearest 1 millisecond.

'emergency_information_end_time'—A 32-bit unsigned integer that shall indicate the end time of the aural/audio representation of the emergency information, as the least-significant 32 bits of the count of the number of seconds since Jan. 1, 1970 00:00:00, International Atomic Time (TAI).

'emergency_information_end_time_ms'—A 10-bit unsigned integer in the range 0 to 999 that shall indicate the milliseconds offset from the time indicated in emergency_information_end_time, such that the formula emergency_information_end_time+(emergency_information_end_time_ms/1000) yields the end time of the audio/aural emergency information to the nearest 1 millisecond.

As illustrated in Table 11, 'multi-stream_info( )' is illustrated in Table 15. In one example, if the multi-stream information is present, the audio program is delivered in more than one elementary stream, where all streams that are part of a bundle of streams together form an audio program. In one example, the main stream shall always be delivered as an MMT broadcast stream. In one example, there may be two options to deliver auxiliary streams: within the MMT broadcast stream using different asset_IDs; they may be signaled within this audio_stream_properties_descriptor( ), or on broadband using DASH delivery. In one example, a bundle_id and the stream_id shall be used to link audio adaptation sets in a DASH Media Presentation Descriptor (MPD) as auxiliary streams to this audio program.

TABLE 15

| Syntax | No. of Bits | Format |
|---|---|---|
| multi-stream_info( ) { | | |
| this_is_main_stream | 1 | bslbf |
| this_stream_id | 7 | uimsbf |
| reserved | 1 | '1' |
| bundle_id | 7 | uimsbf |
| if (this_is_main_stream) { | | |
| reserved | 1 | '1' |
| num_auxiliary_streams | 7 | uimbsf |
| for(m=0; m< num_auxiliary_streams;m++) | | |
| { | | |
| delivery_method | 1 | bslbf |
| auxiliary_stream_id | 7 | uimbsf |
| } | | |
| } | | |
| } | | |

In one example, syntax elements 'this_is_main_stream', 'this_stream_id', 'bundle_id', 'num_auxiliary_streams', 'delivery_method', and 'auxiliary_stream_id' in Table 15 may be based on the following example definitions:

'this_is_main_stream'—A 1-bit Boolean flag that shall indicate, when set to '1', that this stream contains a main stream that can be presented on its own, or that can be combined with additional audio components from an auxiliary stream. When set to '0', this flag shall indicate that this stream contains an auxiliary stream.

'this_stream_id'—A 7-bit unsigned integer field that shall indicate the ID of this audio stream. This ID shall be unique within one bundle, i.e., for all streams that have the same bundle_id.

'bundle_id'—A 7-bit unsigned integer field that shall identify a unique ID for one bundle of audio streams. A bundle consists of exactly one main stream and one or more additional auxiliary streams that shall have the same bundle_id. The auxiliary streams contain additional audio components that can be combined with the main stream. The auxiliary streams can be delivered via broadband or broadcast. The main stream shall always be delivered via broadcast and signaled within this audio_stream_properties_descriptor( ) with 'this_is_main_stream' set to '1'.

'num_auxiliary_streams'—A 7-bit unsigned integer field that shall indicate the number of auxiliary streams that are available on broadband or broadcast to be combined with the main stream.

'delivery_method'—A 1-bit Boolean flag that shall indicate, when set to '1', that the corresponding auxiliary stream is delivered using DASH on HTTP. Access information to locate the stream is given in the DASH MPD. When set to '0', this flag shall indicate that the corresponding auxiliary stream is delivered using MMT, signaled within the same audio_stream_properties_descriptor( ) and located through the asset id signaled for this stream.

'auxiliary_stream_id'—A 7-bit unsigned integer field that shall identify the ID of the auxiliary stream. The ID of all auxiliary streams shall be unique within one bundle.

TABLE 15.5

| Bit | Audio Accessibility Service |
|---|---|
| 0 (MSB) | For Visually Impaired |
| 1 | For Hearing Impaired |
| 2 | Audio/Aural representation of Emergency Information |
| 3-7 | reserved |

Note:
Bit 0, which indicates the presence of the audio accessibility service for visually impaired for the Preselection is the most significant bit (MSB) of the accessibility field. For example, to indicate that the Preselection contains audio accessibility service for Visually Impaired as well as aural/audio representation of emergency information, the value of the accessibility field would be 0xBF (the hexadecimal equivalent of the binary value 1011 1111), where bits 3-7 are set to '1.' It should be noted that in some examples, cases may be supported where reserved bits (here bits 3-7) are '0' as opposed to '1'. This may enable future support for certain type of accessibility.

With respect to Table 15.5, it should be noted that, Visually Impaired may correspond to Video Description Service, and Hearing Impaired may correspond to a dialog enhancement. In one example, a Video Description Service may be an audio service carrying narration describing a television program's key visual elements. These descriptions may be inserted into natural pauses in the program's dialog. Video description makes TV programming more accessible to individuals who are blind or visually impaired. The Video Description Service may be provided by sending a collection of "Music and Effects" components, a Dialog component, and an appropriately labeled Video Description component, which are mixed at the receiver. Alternatively, a Video Description Service may be provided as a single component that is a Complete Mix, with the appropriate label identification. In an example, the dialog enhancement service increases intelligibility of the dialog in an audio scene.

In one example, Table 15.5 specifies the bit used in accessibility field to indicate if the stream contains audio components for a particular audio accessibility service. When the bit specified in Table 15.5 is set to '1' it indicates the stream contains audio components to support the corresponding audio accessibility service. When the bit specified in Table 15.5 is set to '0' it indicates the stream does contain audio components to support the corresponding audio accessibility service.

Referring again to Table 8B, if the multi-stream information is present, the audio program is delivered in more than one elementary stream. This structure lists all IDs of auxiliary streams that carry audio components that are required for a specific presentation. Table 16 provides and example syntax for presentation_aux-stream_info( )

TABLE 16

| Syntax | No. of Bits | Format |
|---|---|---|
| presentation_aux-stream_info( ) { | | |
| num_presentation_aux_streams | 8 | uimbsf |
| for(m=0; m< num_presentation_aux_streams;m++) { | | |
| aux_stream_id | 8 | uimbsf |
| } | | |
| } | | |

As illustrated in Table 11, 'presentation_aux-stream_info( )' is illustrated in Table 16. In one example, if the auxiliary stream information is present, the audio program is delivered in more than one elementary stream. The structure in Table 16 lists all IDs of auxiliary streams that carry audio components that are required for a specific presentation.

In one example, syntax elements 'num_presentation_aux_streams' and 'aux_stream_id' in Table 16 may be based on the following example definitions:

'num_presentation_aux_streams'—An 8-bit unsigned integer field that shall indicate the number of auxiliary streams that are required for this specific Presentation.

'aux_stream_id'—An 8-bit unsigned integer field that shall identify the ID of the auxiliary stream that is required for this specific Presentation.

In this manner, service distribution engine 400 represents an example of a device configured signal information associated with an audio stream according to one or more techniques of this disclosure.

It should be noted that in some examples, signaling of the condition "If (emergency_information_present)" and/or emergency_information_time_info( ) may occur at the stream-level in multi-stream_info( ) and/or presentation_aux-stream_info( ). It should be noted that signaling of the condition "If (emergency_information_present)" and/or emergency_information_time_info( ) at the stream-level may be beneficial in redistribution scenarios, as well as, scenarios where partial presentations may be rendered at a receiver device. It should be noted that in some examples, signaling of the condition "If (emergency_information_present)" and/or emergency_information_time_info( ) may occur at all the auxiliary streams-level (e.g. field 'auxiliary_stream_id') in multi-stream_info( ) but not for the current stream (e.g. field 'this_stream_id').

Figure 5B:
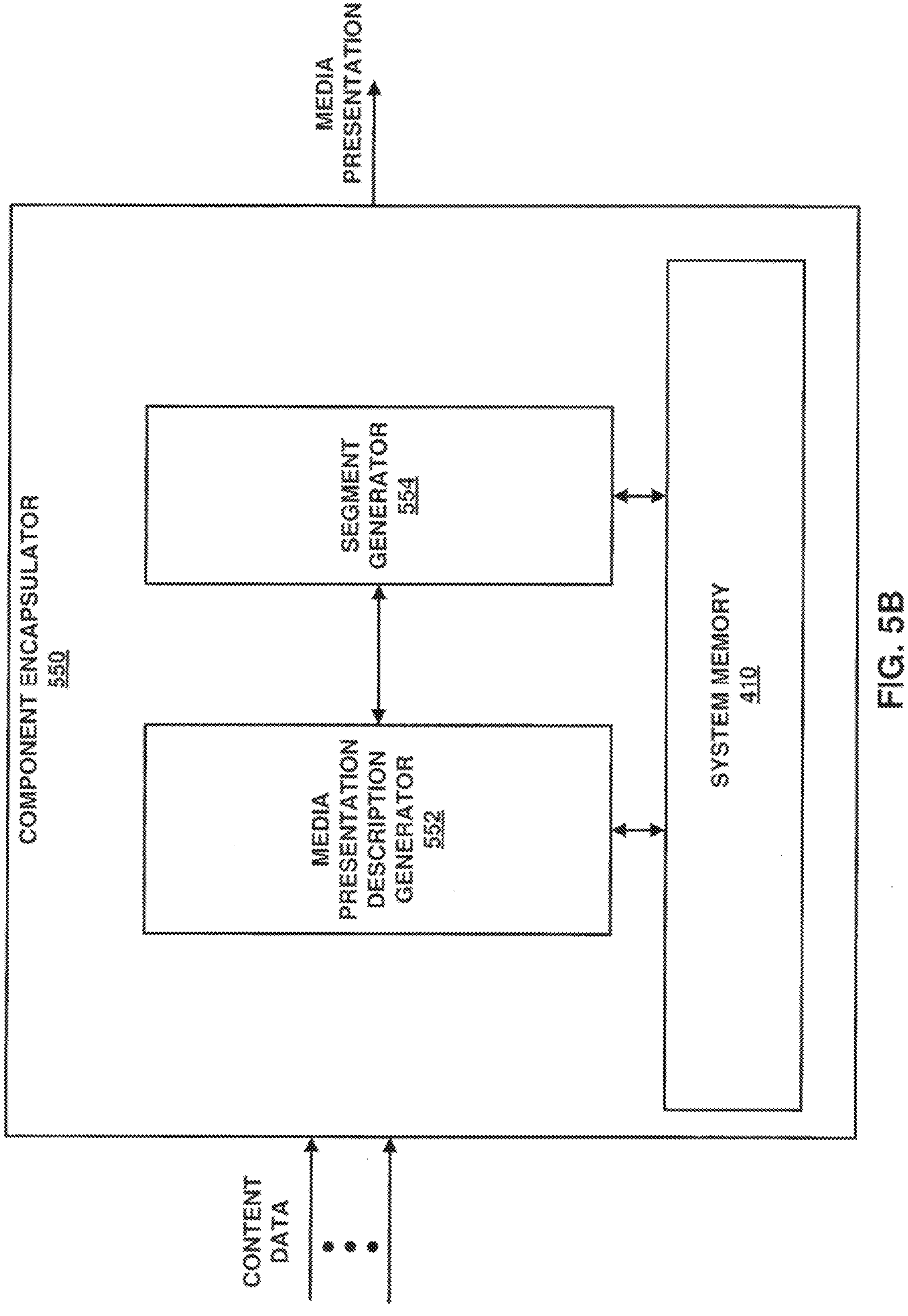
FIG. 5B is a block diagram illustrating an example of a component encapsulator that may implement one or more techniques of this disclosure.

As described above, component encapsulator 402 may be configured to receive one or more media components and generate media presentation based on DASH. FIG. 5B is a block diagram illustrating an example of a component encapsulator that may implement one or more techniques of this disclosure. Component encapsulator 550 may be configured to generate a media presentation according to the techniques described herein. In the example illustrated in FIG. 5B, functional blocks of component encapsulator 550 correspond to functional blocks for generating a media presentation (e.g., a DASH media presentation). As illustrated in FIG. 5B, component encapsulator 550 includes media presentation description generator 552 and segment generator 554. Each of media presentation description generator 552 and segment generator 554 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although component encapsulator 550 is illustrated as having distinct functional blocks, such an illustration is for descriptive purposes and does not limit component encapsulator 550 to a particular hardware architecture. Functions of component encapsulator 550 may be realized using any combination of hardware, firmware and/or software implementations.

Segment generator 554 may be configured to receive media components and generate one or more segments for inclusion in a media presentation. Media presentation description generator 552 may be configured to generate media presentation description fragments. It should be noted that in some examples, a service distribution engine (e.g., service distribution engine 308 or service distribution engine 400) or specific components thereof may be configured to generate signalling messages according to the techniques described herein. As such, description of signalling messages with respect to media presentation description generator 552 should not be construed to limit the techniques described herein. Thus, component encapsulator 402 and/or service distribution engine 400 may be configured to generate MPDs and/or similar signaling data according to one or more of the techniques described herein.

Referring to Table 4.5, above, the example 'Preselection' descriptor fails to provide information indicating whether an audio stream includes audio content associated with emergency information and further fails to provide information associated with audio content associated with emergency information. According to the techniques described herein, in one example, elements or attributes included in a 'Preselection' descriptor of an MPD may indicate whether an audio stream includes audio content associated with emergency information and/or may further provide information associated with audio content associated with emergency information.

In one example, the XML data fragment of a MPD (e.g., within a 'Preselection' descriptor) may define a scheme_id_uri and a value to label an audio preselection as including an audio/aural representation of emergency on-screen text information. For example, the following XML data fragment may be used: <Accessibility schemeIdUri="tag:atsc.org,2016:audio" value="EmergencyInformation"/>

In one example, for the scheme tag:atsc.org,2016:audio, the value of the @value attribute may defined as provided in the example of Table 17.

TABLE 17

| Value | Description |
|---|---|
| EmergencyInformation | The value indicates that the parent element contains audio/aural representation of emergency on-screen text information. |

It should be noted that in other examples, more values may be defined for the example schemeIdURI. It should be noted that in a manner similar to a 'Preselection' descriptor, an AdaptationSet and/or ContentComponent in an MPD may additionally or alternatively include an Accessibility descriptor indicating emergency information. Further, in some examples, a 'Role' element in an MPD may indicate whether an audio stream includes audio content associated with emergency information and/or may further provide information associated with audio content associated with emergency information. For example, one of the allowed values for a 'Role' element in an MPD may indicate that the associated parent element contains audio/aural representation of emergency on-screen text information. In another example, a value attribute for a Role element for a predetermined schemeIdURI may indicate that the associated parent element includes audio/aural representation of emergency on-screen text information. In one example, the associated parent element may include a Period element. In one example, the associated parent element may include an AdaptationSet element. In one example, the associated parent element may include a Preselection element. In one example, the associated parent element may include a ContentComponent element.

In one example, the start and end time of a set of audio media segments (within a MPD period) of the track indicated by an 'Accessibility' element may be required to be equal to the start time and end time of audio/aural representation of emergency on-screen text information. It should be noted that this example constraint may be based on a requirement that start and end of emergency information are known. Alternatively, in a manner similar to that described above with respect to Table 10, in some examples, the start and end time of audio/aural representation of emergency on-screen text information may be included as part of the 'Accessibility' semantics or other MPD semantics. For example, an MPD may include one or more of 'emergency_information_start_time_present, emergency_information_end_time_present', 'emergency_information_start_time, emergency_information_start_time_ms', 'emergency_information_end_time' and/or 'emergency_information_end_time_ms', as described above.

In one example, the presentation time of the first media sample in presentation order of the Period corresponding to the 'Accessibility' element indicating presence of emergency information may be required be equal to the start time of audio/aural representation of emergency on-screen text information. In one example, the presentation time of the last media sample in presentation order of the Period corresponding to the Accessibility element indicating presence of emergency information may be required to be equal to the end time of audio/aural representation of emergency on-screen text information. It should be noted that in the case where a 'Role' element in a MPD is used to indicated emergency information similar constraints with respect to start time and end time of a set of audio media segments may be defined for Role. It should be noted that in the case where a 'Role' element in a MPD is used to indicate emergency information similar constraints with respect to start time and end time of a set of audio media segments may be defined for Role.

In one example, the presentation time of the first media sample in presentation order of the element X (where X may be ContentComponent or AdaptationSet or Preselection) corresponding to the 'Accessibility' element indicating presence of emergency information may be required be equal to the start time of audio/aural representation of emergency on-screen text information. In one example, the presentation time of the last media sample in presentation order of the element X (where X may be ContentComponent or AdaptationSet or Preselection) corresponding to the Accessibility element indicating presence of emergency information may be required to be equal to the end time of audio/aural representation of emergency on-screen text information. It should be noted that in the case where a 'Role' element in a MPD is used to indicated emergency information similar constraints with respect to start time and end time of a set of audio media segments may be defined for Role.

Figure 6:
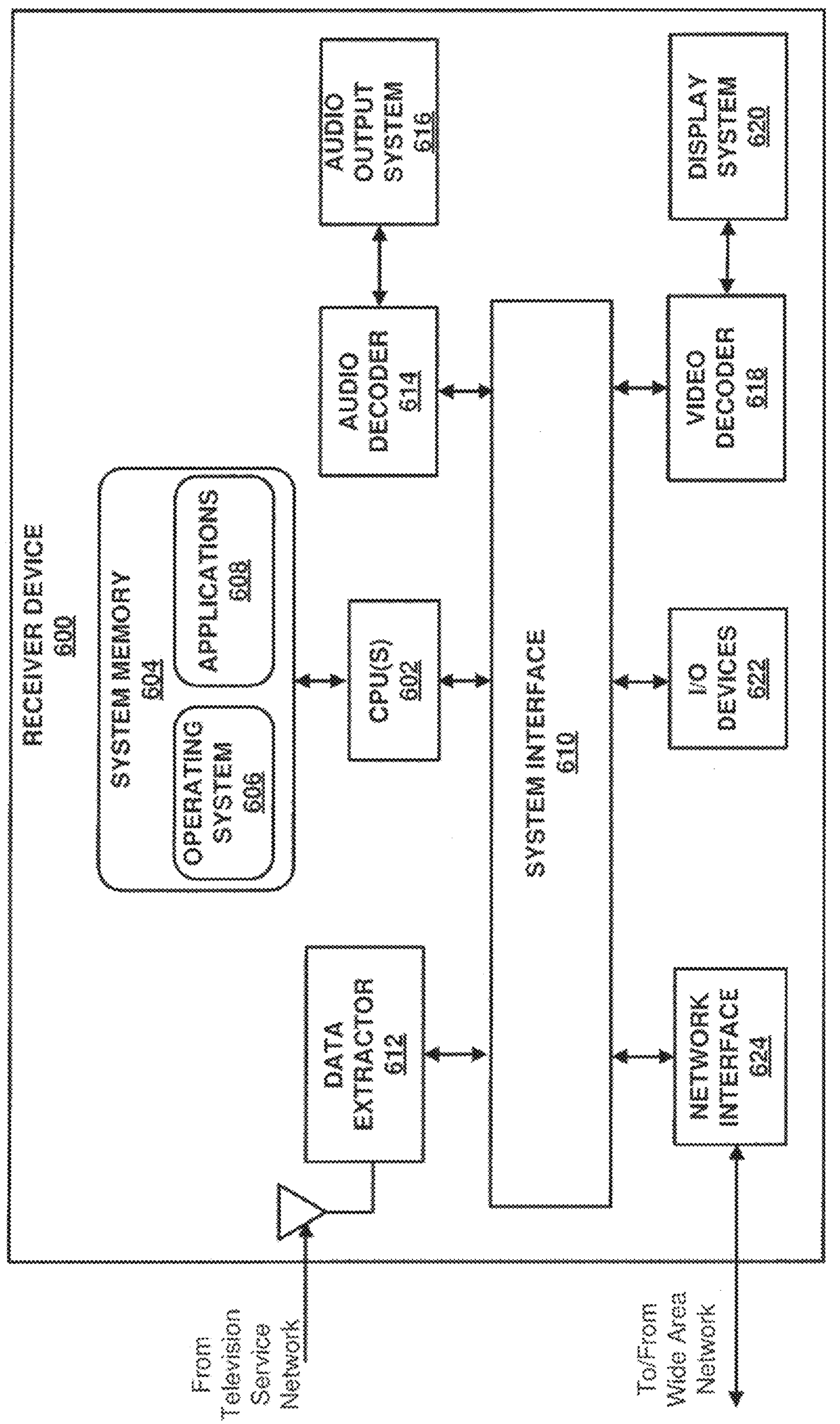
FIG. 6 is a block diagram illustrating an example of a receiver device that may implement one or more techniques of this disclosure.

FIG. 6 is a block diagram illustrating an example of a receiver device that may implement one or more techniques of this disclosure. That is, receiver device 600 may be configured to parse a signal based on the semantics described above with respect to one or more of the tables described above. Further, receiver device 600 may be configured to parse information associated with an audio stream. Receiver device 600 is an example of a computing device that may be configured to receive data from a communications network and allow a user to access multimedia content. In the example illustrated in FIG. 6, receiver device 600 is configured to receive data via a television network, such as, for example, television service network 304 described above. Further, in the example illustrated in FIG. 6, receiver device 600 is configured to send and receive data via a wide area network. It should be noted that in other examples, receiver device 600 may be configured to simply receive data through a television service network 304. The techniques described herein may be utilized by devices configured to communicate using any and all combinations of communications networks.

As illustrated in FIG. 6, receiver device 600 includes central processing unit(s) 602, system memory 604, system interface 610, data extractor 612, audio decoder 614, audio output system 616, video decoder 618, display system 620, I/O device(s) 622, and network interface 624. As illustrated in FIG. 6, system memory 604 includes operating system 606 and applications 608. Each of central processing unit(s) 602, system memory 604, system interface 610, data extractor 612, audio decoder 614, audio output system 616, video decoder 618, display system 620, I/O device(s) 622, and network interface 624 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although receiver device 600 is illustrated as having distinct functional blocks, such an illustration is for descriptive purposes and does not limit receiver device 600 to a particular hardware architecture. Functions of receiver device 600 may be realized using any combination of hardware, firmware and/or software implementations.

CPU(s) 602 may be configured to implement functionality and/or process instructions for execution in receiver device 600. CPU(s) 602 may include single and/or multi-core central processing units. CPU(s) 602 may be capable of retrieving and processing instructions, code, and/or data structures for implementing one or more of the techniques described herein. Instructions may be stored on a computer readable medium, such as system memory 604.

System memory 604 may be described as a non-transitory or tangible computer-readable storage medium. In some examples, system memory 604 may provide temporary and/or long-term storage. In some examples, system memory 604 or portions thereof may be described as non-volatile memory and in other examples portions of system memory 604 may be described as volatile memory. System memory 604 may be configured to store information that may be used by receiver device 600 during operation. System memory 704 may be used to store program instructions for execution by CPU(s) 602 and may be used by programs running on receiver device 600 to temporarily store information during program execution. Further, in the example where receiver device 600 is included as part of a digital video recorder, system memory 604 may be configured to store numerous video files.

Applications 608 may include applications implemented within or executed by receiver device 600 and may be implemented or contained within, operable by, executed by, and/or be operatively/communicatively coupled to components of receiver device 600. Applications 608 may include instructions that may cause CPU(s) 602 of receiver device 600 to perform particular functions. Applications 608 may include algorithms which are expressed in computer programming statements, such as, for-loops, while-loops, if-statements, do-loops, etc. Applications 608 may be developed using a specified programming language. Examples of programming languages include, Java™, Jini™, C, C++, Objective C, Swift, Perl, Python, PhP, UNIX Shell, Visual Basic, and Visual Basic Script. In the example where receiver device 600 includes a smart television, applications may be developed by a television manufacturer or a broadcaster. As illustrated in FIG. 6, applications 608 may execute in conjunction with operating system 606. That is, operating system 606 may be configured to facilitate the interaction of applications 608 with CPUs(s) 602, and other hardware components of receiver device 600. Operating system 606 may be an operating system designed to be installed on set-top boxes, digital video recorders, televisions, and the like. It should be noted that techniques described herein may be utilized by devices configured to operate using any and all combinations of software architectures.

System interface 610 may be configured to enable communications between components of receiver device 600. In one example, system interface 610 comprises structures that enable data to be transferred from one peer device to another peer device or to a storage medium. For example, system interface 610 may include a chipset supporting Accelerated Graphics Port (AGP) based protocols, Peripheral Component Interconnect (PCI) bus based protocols, such as, for example, the PCI Express™ (PCIe) bus specification, which is maintained by the Peripheral Component Interconnect Special Interest Group, or any other form of structure that may be used to interconnect peer devices (e.g., proprietary bus protocols).

As described above, receiver device 600 is configured to receive and, optionally, send data via a television service network. As described above, a television service network may operate according to a telecommunications standard. A telecommunications standard may define communication properties (e.g., protocol layers), such as, for example, physical signaling, addressing, channel access control, packet properties, and data processing. In the example illustrated in FIG. 6, data extractor 612 may be configured to extract video, audio, and data from a signal. A signal may be defined according to, for example, aspects DVB standards, ATSC standards, ISDB standards, DTMB standards, DMB standards, and DOCSIS standards.

Data extractor 612 may be configured to extract video, audio, and data, from a signal generated by service distribution engine 400 described above. That is, data extractor 612 may operate in a reciprocal manner to service distribution engine 400. Further, data extractor 612 may be configured to parse link layer packets based on any combination of one or more of the structures described above.

Data packets may be processed by CPU(s) 602, audio decoder 614, and video decoder 618. Audio decoder 614 may be configured to receive and process audio packets. For example, audio decoder 614 may include a combination of hardware and software configured to implement aspects of an audio codec. That is, audio decoder 614 may be configured to receive audio packets and provide audio data to audio output system 616 for rendering. Audio data may be coded using multi-channel formats such as those developed by Dolby and Digital Theater Systems. Audio data may be coded using an audio compression format. Examples of audio compression formats include Motion Picture Experts Group (MPEG) formats, Advanced Audio Coding (AAC) formats, DTS-HD formats, and Dolby Digital (AC-3, AC-4) formats. Audio output system 616 may be configured to render audio data. For example, audio output system 616 may include an audio processor, a digital-to-analog converter, an amplifier, and a speaker system. A speaker system may include any of a variety of speaker systems, such as headphones, an integrated stereo speaker system, a multi-speaker system, or a surround sound system.

Video decoder 618 may be configured to receive and process video packets. For example, video decoder 618 may include a combination of hardware and software used to implement aspects of a video codec. In one example, video decoder 618 may be configured to decode video data encoded according to any number of video compression standards, such as ITU-T H.262 or ISO/IEC MPEG-2 Visual, ISO/IEC MPEG-4 Visual, ITU-T H.264 (also known as ISO/IEC MPEG-4 Advanced video Coding (AVC)), and High-Efficiency Video Coding (HEVC). Display system 620 may be configured to retrieve and process video data for display. For example, display system 620 may receive pixel data from video decoder 618 and output data for visual presentation. Further, display system 620 may be configured to output graphics in conjunction with video data, e.g., graphical user interfaces. Display system 620 may comprise one of a variety of display devices such as a liquid crystal display (LCD), a plasma display, an organic light emitting diode (OLED) display, or another type of display device capable of presenting video data to a user. A display device may be configured to display standard definition content, high definition content, or ultra-high definition content.

I/O device(s) 622 may be configured to receive input and provide output during operation of receiver device 600. That is, I/O device(s) 622 may enable a user to select multimedia content to be rendered. Input may be generated from an input device, such as, for example, a push-button remote control, a device including a touch-sensitive screen, a motion-based input device, an audio-based input device, or any other type of device configured to receive user input. I/O device(s) 622 may be operatively coupled to receiver device 600 using a standardized communication protocol, such as for example, Universal Serial Bus protocol (USB), Bluetooth, ZigBee or a proprietary communications protocol, such as, for example, a proprietary infrared communications protocol.

Network interface 624 may be configured to enable receiver device 600 to send and receive data via a local area network and/or a wide area network. Network interface 624 may include a network interface card, such as an Ethernet card, an optical transceiver, a radio frequency transceiver, or any other type of device configured to send and receive information. Network interface 624 may be configured to perform physical signaling, addressing, and channel access control according to the physical and Media Access Control (MAC) layers utilized in a network. Receiver device 600 may be configured to parse a signal generated according to any of the techniques described above with respect to FIG. 6. In this manner, receiver device 600 represents an example of a device configured parse a syntax element indicating the number of a concatenated syntax elements identifying a caption service, and parse one or more concatenated syntax elements identifying a caption service.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

OVERVIEW

According to another example of the disclosure, a device for signaling information associated with an audio stream comprises one or more processors configured to signal a syntax element specifying the number of available languages within a presentation associated with an audio stream and signal one or more syntax elements identifying each of the available languages.

According to another example of the disclosure, an apparatus signaling information associated with an audio stream comprises means for signaling a syntax element specifying the number of available languages within a presentation associated with an audio and means for and signaling one or more syntax elements identifying each of the available languages.

According to another example of the disclosure, a non-transitory computer-readable storage medium comprises instructions stored thereon that upon execution cause one or more processors of a device to signal a syntax element specifying the number of available languages within a presentation associated with an audio stream and signal one or more syntax elements identifying each of the available languages.

According to another example of the disclosure, a device for parsing information associated with an audio stream comprises one or more processors configured to parse a syntax element specifying the number of available languages within a presentation associated with an audio stream and parse one or more syntax elements identifying each of the available languages.

According to another example of the disclosure, an apparatus for parsing information associated with an audio stream comprises means for parsing a syntax element specifying the number of available languages within a presentation associated with an audio stream and means for parsing one or more syntax elements identifying each of the available languages.

According to another example of the disclosure, a non-transitory computer-readable storage medium comprises instructions stored thereon that upon execution cause one or more processors of a device to parse a syntax element specifying the number of available languages within a presentation associated with an audio stream and parse one or more syntax elements identifying each of the available languages.

CROSS REFERENCE

The present application is a continuation application of U.S. patent application Ser. No. 18/095,804, filed on Jan. 11, 2023, which is a continuation application of U.S. patent application Ser. No. 17/037,474, filed on Sep. 29, 2020, which is a continuation application of U.S. patent application Ser. No. 16/087,601, filed on Sep. 21, 2018, which is a National Stage application of International Application Serial No. PCT/JP2017/011592, filed on Mar. 23, 2017, which claims priority under 35 U.S.C. § 119 on provisional Application No. 62/313,635 on Mar. 25, 2016, provisional Application No. 62/315,611 on Mar. 30, 2016, provisional Application No. 62/319,209 on Apr. 6, 2016, and provisional Application No. 62/325,406 on Apr. 20, 2016, the entire contents of which are hereby incorporated by reference.

The invention claimed is:

1. A method of receiving an audio stream properties descriptor, the method comprising:
  receiving the audio stream properties descriptor, wherein the audio stream properties descriptor includes:
  a language present syntax element indicating whether language information for a presentation is present,
  an accessibility role present syntax element indicating whether accessibility and role information for the presentation is present,
  a number of languages minus one syntax element in a case that a value of the language present syntax element is set to 1, wherein the number of languages minus one syntax element plus one specifies a number of languages that are available within the presentation,
  an accessibility syntax element for each of the number of languages in a case that a value of the accessibility role present syntax element is set to 1, wherein:
    the accessibility syntax element is an 8-bit unsigned integer field,
    Bit 0 of the accessibility syntax element indicates a presence of an audio accessibility service for visually impaired for a preselection is a most significant bit of an accessibility field,
    Bit 1 of the accessibility syntax element indicates that the presentation contains dialog enhancement, and
    Bit 2 of the accessibility syntax element indicates that the presentation conatins an audio representation of emergency information, and
  a role syntax element indicating a role for the presentation in the case that the value of the accessibility role present syntax element is set to 1.

2. A device for signaling an audio stream properties descriptor, the device comprising:
  one or more processors configured to:
  signal the audio stream properties descriptor, wherein the audio stream properties descriptor includes:
  a language present syntax element indicating whether language information for a presentation is present,
  an accessibility role present syntax element indicating whether accessibility and role information for the presentation is present,
  a number of languages minus one syntax element in a case that a value of the language present syntax element is set to 1, wherein the number of languages minus one syntax element plus one specifies a number of languages that are available within the presentation,
  an accessibility syntax element for each of the number of languages in a case that a value of the accessibility role present syntax element is set to 1, wherein:
  the accessibility syntax element is an 8-bit unsigned integer,
  Bit 0 of the accessibility syntax element indicates a presence of an audio accessibility service for visually impaired for a preselection is a most significant bit of an accessibility field,
  Bit 1 of the accessibility syntax element indicates that the presentation contains dialog enhancement, and
  Bit 2 of the accessibility syntax element indicates that the presentation contains an audio representation of emergency information, and
  a role syntax element indicating a role for the presentation, in the case that the value of the accessibility role present syntax element is set to 1.

3. A device for receiving an audio stream properties descriptor, the device comprising:
  one or more processors configured to:
  receive the audio stream properties descriptor, wherein the audio stream properties descriptor includes:
  a language present syntax element indicating whether language information for a presentation is present,
  an accessibility role present syntax element indicating whether accessibility and role information for the presentation is present,
  a number of languages minus one syntax element in a case that a value of the language present syntax element is set to 1, wherein the number of languages minus one syntax element plus one specifies a number of languages that are available within the presentation,
  an accessibility syntax element for each of the number of languages in a case that a value of the accessibility role present syntax element is set to 1, wherein:
  the accessibility syntax element is an 8-bit unsigned integer field,
  Bit 0 of the accessibility syntax element indicates a presence of an audio accessibility service for visually impaired for a preselection is a most significant bit of an accessibility field,
  Bit 1 of the accessibility syntax element indicates that the presentation contains dialog enhancement, and
  Bit 2 of the accessibility syntax element indicates that the presentation contains an audio representation of emergency information, and a role syntax element indicating a role for the presentation in the case that the value of the accessibility role present syntax element is set to 1.

* * * * *